(12) United States Patent
Bobbala et al.

(10) Patent No.: US 11,120,025 B2
(45) Date of Patent: Sep. 14, 2021

(54) SYSTEM AND METHOD FOR COMPARING AND SELECTIVELY MERGING DATABASE RECORDS

(71) Applicant: Hexagon Technology Center GmbH, Heerbrugg (CH)

(72) Inventors: Pradeep Reddy Bobbala, Telangana (IN); Srinivas Mallepally, Telangana (IN); Satish Subramanya Hota, Skillman, NJ (US)

(73) Assignee: Hexagon Technology Center GmbH, Heerbrugg (CH)

(*) Notice: Subject to any disclaimer, the term of this patent is extended or adjusted under 35 U.S.C. 154(b) by 253 days.

(21) Appl. No.: 16/104,361

(22) Filed: Aug. 17, 2018

(65) Prior Publication Data

US 2019/0384847 A1 Dec. 19, 2019

(30) Foreign Application Priority Data

Jun. 16, 2018 (IN) .............................. 201841022589

(51) Int. Cl.
*G06F 16/2455* (2019.01)
*G06F 7/14* (2006.01)
(Continued)

(52) U.S. Cl.
CPC ............ *G06F 16/2456* (2019.01); *G06F 7/14* (2013.01); *G06F 16/215* (2019.01); *G06F 16/2282* (2019.01)

(58) Field of Classification Search
None
See application file for complete search history.

(56) References Cited

U.S. PATENT DOCUMENTS

2010/0223231 A1* 9/2010 Lee ..................... G06F 16/2456
707/610
2012/0272225 A1* 10/2012 Thota ................... G06F 16/288
717/168
2019/0236316 A1* 8/2019 Watkins ................ G06F 16/152

FOREIGN PATENT DOCUMENTS

WO 2012130489 A1 10/2012
WO WO-2012130489 A1 * 10/2012 ........... G06F 16/273

OTHER PUBLICATIONS

Anonymous—"ApexSQL Data Diff—SQL Server data compar tool: ApexSQL", Jul. 19, 2015, https://web.archive.org/web/20150719070146/http://www.apexsql.com/sql_tools_datadiff.aspx, Retrieved from the Internet on Aug. 19, 2019, 13 pages.
(Continued)

*Primary Examiner* — James Trujillo
*Assistant Examiner* — J Mitchell Curran
(74) *Attorney, Agent, or Firm* — Nutter McClennen & Fish LLP

(57) ABSTRACT

Embodiments of the present invention allow a Source database and a Target database to be compared and merged in such a way that logically relevant data is considered and merged while ignoring irrelevant differences (e.g., object identifiers) and that all dependencies across relational database tables are considered and merged. Some exemplary embodiments are discussed herein with reference to databases such as the Standard Database (SDB) for Intergraph Smart™ Reference Data product from Intergraph Corporation and are referred to generally as the "SDB Merge Tool," although the disclosed concepts can be applied more generally to other types of databases.

21 Claims, 31 Drawing Sheets
(30 of 31 Drawing Sheet(s) Filed in Color)

M_UNITS in Source

| UNIT_ID | UG_ID | UNIT_CODE |
|---|---|---|
| 1002 | 19 | M2/UOM |
| 1003 | 20 | kg |

M_UNIT_GROUPS in Source

| UG_ID | UG_CODE |
|---|---|
| 19 | AREA |
| 20 | WEIGHT |

M_UNITS in Target

| UNIT_ID | UG_ID | UNIT_CODE |
|---|---|---|
| 1006 | 21 | M2/UOM |

M_UNIT_GROUPS in Target

| UG_ID | UG_CODE |
|---|---|
| 21 | AREA |
| 22 | WEIGHT |

(51) Int. Cl.
*G06F 16/215* (2019.01)
*G06F 16/22* (2019.01)

(56) References Cited

OTHER PUBLICATIONS

International Searching Authority—International Search Report and Written Opinion for International Application No. PCT/US2019/037227, dated Aug. 27, 2019, 19 pages.
Robidoux—"SQL Server Comparison Tools",: May 11, 2015, XP055613451, https://web.archive.org/web/20150511162700/http://www.mssqltips.com/sqlservertip/1069/sql-server-comparison-tools, Retrieved from the Internet on Aug. 16, 2019, 4 pages.

* cited by examiner

FIG. 1

M_UNITS

| UNIT_ID | UG_ID | UNIT_CODE | USR_ID | LMOD | INT_REV | PRECISION | SDB_INFO |
|---|---|---|---|---|---|---|---|
| | 5012 | kg/m | SPRDSDB | 18-Sep-2008 14:44:23 | 2 | | |
| 5441 | 5012 | kg/1000pc | SPRDSDB | 19-Sep-2008 14:43:10 | 1 | | |
| 5400 | 5008 | deg | SPRDSDB | 01-May-2007 07:46:30 | 1 | | |
| 5320 | 5000 | m2/UOM | SPRDSDB | 02-Nov-2006 08:50:54 | 1 | | |
| 5331 | 5007 | AED | SPRDSDB | 04-Oct-2006 13:57:36 | 1 | | |
| 5232 | 5007 | AUD | SPRDSDB | 04-Oct-2006 13:57:36 | 1 | | |

FIG. 2

M_UNIT_GROUPS

| UG_ID | UG_CODE |
|---|---|
| 5000 | AREA |
| 5007 | CURRENCY |
| 5008 | TEMPERATURE |
| 5012 | WEIGHT |

FIG. 3

M_UNITS in Source

| UNIT_ID | UG_ID | UNIT_CODE | USR_ID | LMOD | INT_REV | PRECISION | SDB_INFO |
|---|---|---|---|---|---|---|---|
| | | 5012 kg/m | SPRDSDB | 09/18/2008 2:44:3... | | 2 | |

| UNIT_ID | UG_ID | UNIT_CODE | USR_ID | LMOD | INT_REV | PRECISION | SDB_INFO |
|---|---|---|---|---|---|---|---|
| 5400 | | 5008 deg | SPRDSDB | 05/01/2007 7:40:30 AM | | 1 | |

M_UNITS in Target

| UNIT_ID | UG_ID | UNIT_CODE | USR_ID | LMOD | INT_REV | PRECISION | SDB_INFO |
|---|---|---|---|---|---|---|---|
| 5304 | | 5012 kg/m | SPRDSDB | 09/18/2008 2:44:2... | | 2 | |

| UNIT_ID | UG_ID | UNIT_CODE | USR_ID | LMOD | INT_REV | PRECISION | SDB_INFO |
|---|---|---|---|---|---|---|---|
| | | 5008 deg | SPRDSDB | 08/01/2007 7:40:3... | | 2 | |

FIG. 4

M_UNITS in Source

| UNIT_ID | UG_ID | UNIT_CODE | USR_ID | LMOD | INT_REV | PRECISION | SDB |
|---|---|---|---|---|---|---|---|
| 5440 | 5012 | kg/m | | SPRDSDB 09/18/2008 2:44:2... | | 2 | |

| UNIT_ID | UG_ID | UNIT_CODE | USR_ID | LMOD | INT_REV | PRECISION | SDB_I |
|---|---|---|---|---|---|---|---|
| 5400 | 5008 | deg | | SPRDSDB 06/01/2007 7:40:30 AM | | 1 | |

M_UNIT_GROUPS in Source

| UG_ID | UG_CODE |
|---|---|
| 5000 | AREA |
| 5007 | CURRENCY |
| 5008 | TEMPERATURE |
| 5012 | WEIGHT |

M_UNITS in Target

| UNIT_ID | UG_ID | UNIT_CODE | USR_ID | LMOD | INT_REV | PRECISION | SDB |
|---|---|---|---|---|---|---|---|
| 5304 | 5012 | kg/m | | SPRDSDB 09/18/2008 2:44:2... | | 2 | |

| UNIT_ID | UG_ID | UNIT_CODE | USR_ID | LMOD | INT_REV | PRECISION | SDB |
|---|---|---|---|---|---|---|---|
| 5440 | 5008 | deg | | SPRDSDB 06/01/2007 7:40:3... | | 1 | |

M_UNIT_GROUPS in Target

| UG_ID | UG_CODE |
|---|---|
| 5000 | AREA |
| 5007 | CURRENCY |
| 5008 | TEMPERATURE |
| 5012 | WEIGHT |

FIG. 5

M_UNIT in Source

| UNIT_ID | UG_ID | UNIT_CODE |
|---|---|---|
| 5440 | 5012 | kg/m |
| 5400 | 5008 | deg |

M_UNIT_GROUPS in Source

| UG_ID | UG_CODE |
|---|---|
| 5000 | AREA |
| 5007 | CURRENCY |
| 5008 | TEMPERATURE |
| 5012 | WEIGHT |

M_UNIT in Target

| UNIT_ID | UG_ID | UNIT_CODE |
|---|---|---|
| 5304 | 5008 | kg/m |
| 5440 | 5012 | deg |

M_UNIT_GROUPS in Target

| UG_ID | UG_CODE |
|---|---|
| 5000 | AREA |
| 5007 | CURRENCY |
| 5008 | WEIGHT |
| 5012 | TEMPERATURE |

FIG. 6

M_UNIT in Source

| UNIT_ID | UG_ID | UNIT_CODE |
|---|---|---|
| 5440 | 5012 | kg/m |
| 5400 | 5008 | deg |

M_UNIT_GROUPS in Source

| UG_ID | UG_CODE |
|---|---|
| 5000 | AREA |
| 5007 | CURRENCY |
| 5008 | TEMPERATURE |
| 5012 | WEIGHT |

M_UNIT in Target

| UNIT_ID | UG_ID | UNIT_CODE |
|---|---|---|
| 5304 | 5008 | kg/m |
| 5440 | 5012 | deg |

M_UNIT_GROUPS in Target

| UG_ID | UG_CODE |
|---|---|
| 5000 | AREA |
| 5007 | CURRENCY |
| 5008 | WEIGHT |
| 5012 | ANGLE |

FIG. 7

M_UNIT in Source

| UNIT_ID | UG_ID | UNIT_CODE |
|---|---|---|
| 5440 | 5012 | kg/m |
| 5400 | 5008 | deg |

M_UNIT_GROUPS in Source

| UG_ID | UG_CODE |
|---|---|
| 5000 | AREA |
| 5007 | CURRENCY |
| 5008 | TEMPERATURE |
| 5012 | WEIGHT |

M_UNIT in Target

| UNIT_ID | UG_ID | UNIT_CODE |
|---|---|---|
| 5304 | 5008 | kg/m |

M_UNIT_GROUPS in Target

| UG_ID | UG_CODE |
|---|---|
| 5000 | AREA |
| 5007 | CURRENCY |
| 5008 | WEIGHT |
| 5012 | ANGLE |

FIG. 8

M_UNIT in Source

| UNIT_ID | UG_ID | UNIT_CODE |
|---|---|---|
| 5440 | 5012 | kg/m |

M_UNIT_GROUPS in Source

| UG_ID | UG_CODE |
|---|---|
| 5000 | AREA |
| 5007 | CURRENCY |
| 5008 | TEMPERATURE |
| 5012 | WEIGHT |

M_UNIT in Target

| UNIT_ID | UG_ID | UNIT_CODE |
|---|---|---|
| 5304 | 5008 | kg/m |
| 5400 | 5012 | deg |

M_UNIT_GROUPS in Target

| UG_ID | UG_CODE |
|---|---|
| 5000 | AREA |
| 5007 | CURRENCY |
| 5008 | WEIGHT |
| 5012 | TEMPERATURE |

FIG. 9

M_UNITS in Source

| UNIT_ID | UG_ID | UNIT_CODE |
|---|---|---|
| 1002 | 19 | M2/UOM |
| 1003 | 20 | kg |

M_UNIT_GROUPS in Source

| UG_ID | UG_CODE |
|---|---|
| 19 | AREA |
| 20 | WEIGHT |

M_UNITS in Target

| UNIT_ID | UG_ID | UNIT_CODE |
|---|---|---|
| 1006 | 21 | M2/UOM |

M_UNIT_GROUPS in Target

| UG_ID | UG_CODE |
|---|---|
| 21 | AREA |

FIG. 10

| Source | | Target | |
|---|---|---|---|
| UG_CODE | UNIT_CODE | UG_CODE | UNIT_CODE |
| AREA | M2/UOM | AREA | M2/UOM |
| WEIGHT | kg | | |

FIG. 11

M_UNITS in Source

| UNIT_ID | UG_ID | UNIT_CODE |
|---|---|---|
| 1002 | 19 | M2/UOM |
| 1003 | 20 | kg |

M_UNIT_GROUPS in Source

| UG_ID | UG_CODE |
|---|---|
| 19 | AREA |
| 20 | WEIGHT |

M_UNITS in Target

| UNIT_ID | UG_ID | UNIT_CODE |
|---|---|---|
| 1006 | 21 | M2/UOM |

M_UNIT_GROUPS in Target

| UG_ID | UG_CODE |
|---|---|
| 21 | AREA |
| 22 | WEIGHT |

FIG. 12

M_UNITS in Source

| UNIT_ID | UG_ID | UNIT_CODE |
|---|---|---|
| 1002 | 19 | M2/UOM |
| 1003 | 20 | kg |

M_UNIT_GROUPS in Source

| UG_ID | UG_CODE |
|---|---|
| 19 | AREA |
| 20 | WEIGHT |

M_UNITS in Target

| UNIT_ID | UG_ID | UNIT_CODE |
|---|---|---|
| 1006 | 21 | M2/UOM |
| 1007 | 22 | kg |

M_UNIT_GROUPS in Target

| UG_ID | UG_CODE |
|---|---|
| 21 | AREA |
| 22 | WEIGHT |

FIG. 13

M_UNITS in Source

| UNIT_ID | UG_ID | UNIT_CODE |
|---|---|---|
| 1002 | 19 | M2/UOM |
| 1003 | 20 | kg |

M_UNIT_GROUPS in Source

| UG_ID | UG_CODE |
|---|---|
| 19 | AREA |
| 20 | WEIGHT |

M_UNITS in Target

| UNIT_ID | UG_ID | UNIT_CODE |
|---|---|---|
| 1006 | 21 | M2/UOM |

M_UNIT_GROUPS in Target

| UG_ID | UG_CODE |
|---|---|
| 21 | AREA |
| 22 | WEIGHT |

FIG. 17

M_UNITS in Source

| UNIT_ID | UG_ID | UNIT_CODE |
|---|---|---|
| 1002 | 19 | M2/UOM |
| 1003 | 20 | kg |

M_UNIT_GROUPS in Source

| UG_ID | UG_CODE |
|---|---|
| 19 | AREA |
| 20 | WEIGHT |

M_UNITS in Target

| UNIT_ID | UG_ID | UNIT_CODE |
|---|---|---|
| 1006 | 21 | M2/UOM |
| 1007 | 22 | kg |

M_UNIT_GROUPS in Target

| UG_ID | UG_CODE |
|---|---|
| 21 | AREA |
| 22 | WEIGHT |

FIG. 18

M_UNITS

| UNIT_ID | UNIT_CODE |
|---|---|
| 1 | Kg |

M_UNIT_NLS

| UNIT_ID | NLS_ID | DESCRIPTION |
|---|---|---|
| 1 | 1 | Kilogram |
| 1 | 2 | 1000grams |

FIG. 19

| UNIT_CODE | DESCRIPTION |
|---|---|
| Kg | Kilogram |

FIG. 20

| UNIT_CODE | DESCRIPTION |
|---|---|
| Kg | 1000grams |

FIG. 21

M_UNITS in Source

| UNIT_ID | UG_ID | UNIT_CODE |
|---|---|---|
| 1002 | 19 | M2/UOM |
| 1003 | 20 | kg |

M_UNIT_GROUPS in Source

| UG_ID | X_ID | UG_CODE |
|---|---|---|
| 19 | 57 | AREA |
| 20 | 58 | WEIGHT |
| 21 | 57 | VOLUME |

X in Source

| X_ID | X_CODE |
|---|---|
| 57 | SPACIAL |
| 58 | PHYSICAL |

M_UNITS in Target

| UNIT_ID | UG_ID | UNIT_CODE |
|---|---|---|
| 1006 | 21 | M2/UOM |

M_UNIT_GROUPS in Target

| UG_ID | X_ID | UG_CODE |
|---|---|---|
| 21 | 67 | AREA |

X in Target

| X_ID | X_CODE |
|---|---|
| 67 | SPACIAL |

FIG. 22

M_UNITS in Source

| UNIT_ID | UG_ID | UNIT_CODE |
|---|---|---|
| 1002 | 19 | M2/UOM |
| 1003 | 20 | kg |

M_UNIT_GROUPS in Source

| UG_ID | X_ID | UG_CODE |
|---|---|---|
| 19 | 57 | AREA |
| 20 | 58 | WEIGHT |
| 21 | 57 | VOLUME |

X in Source

| X_ID | X_CODE |
|---|---|
| 57 | SPACIAL |
| 58 | PHYSICAL |

M_UNITS in Target

| UNIT_ID | UG_ID | UNIT_CODE |
|---|---|---|
| 1006 | 21 | M2/UOM |

M_UNIT_GROUPS in Target

| UG_ID | X_ID | UG_CODE |
|---|---|---|
| 21 | 67 | AREA |

X in Target

| X_ID | X_CODE |
|---|---|
| 67 | SPACIAL |
| 68 | PHYSICAL |

FIG. 23

M_UNITS in Source

| UNIT_ID | UG_ID | UNIT_CODE |
|---|---|---|
| 1002 | 19 | M2/UOM |
| 1003 | 20 | kg |

M_UNIT_GROUPS in Source

| UG_ID | X_ID | UG_CODE |
|---|---|---|
| 19 | 57 | AREA |
| 20 | 58 | WEIGHT |
| 21 | 57 | VOLUME |

X in Source

| X_ID | X_CODE |
|---|---|
| 57 | SPACIAL |
| 58 | PHYSICAL |

M_UNITS in Target

| UNIT_ID | UG_ID | UNIT_CODE |
|---|---|---|
| 1006 | 21 | M2/UOM |

M_UNIT_GROUPS in Target

| UG_ID | X_ID | UG_CODE |
|---|---|---|
| 21 | 67 | AREA |
| 69 | 68 | WEIGHT |

X in Target

| X_ID | X_CODE |
|---|---|
| 67 | SPACIAL |
| 68 | PHYSICAL |

FIG. 24

M_UNITS in Source

| UNIT_ID | UG_ID | UNIT_CODE |
|---|---|---|
| 1002 | 19 | M2/UOM |
| 1003 | 20 | kg |

M_UNIT_GROUPS in Source

| UG_ID | X_ID | UG_CODE |
|---|---|---|
| 19 | 57 | AREA |
| 20 | 58 | WEIGHT |
| 21 | 57 | VOLUME |

X in Source

| X_ID | X_CODE |
|---|---|
| 57 | SPACIAL |
| 58 | PHYSICAL |

M_UNITS in Target

| UNIT_ID | UG_ID | UNIT_CODE |
|---|---|---|
| 1006 | 21 | M2/UOM |
| 1007 | 69 | kg |

M_UNIT_GROUPS in Target

| UG_ID | X_ID | UG_CODE |
|---|---|---|
| 21 | 67 | AREA |
| 69 | 68 | WEIGHT |

X in Target

| X_ID | X_CODE |
|---|---|
| 67 | SPACIAL |
| 68 | PHYSICAL |

FIG. 25

M_UNITS in Source

| UNIT_ID | X_ID | UG_ID | UNIT_CODE |
|---|---|---|---|
| 1002 | 57 | 19 | M2/UOM |
| 1003 | 58 | 20 | kg |

M_UNIT_GROUPS in Source

| UG_ID | UG_CODE |
|---|---|
| 19 | AREA |
| 20 | WEIGHT |
| 21 | VOLUME |

X in Source

| X_ID | X_CODE |
|---|---|
| 57 | SPACIAL |
| 58 | PHYSICAL |

M_UNITS in Target

| UNIT_ID | X_ID | UG_ID | UNIT_CODE |
|---|---|---|---|
| 1006 | 67 | 21 | M2/UOM |

M_UNIT_GROUPS in Target

| UG_ID | UG_CODE |
|---|---|
| 21 | AREA |

X in Target

| X_ID | X_CODE |
|---|---|
| 67 | SPACIAL |

FIG. 26

M_UNITS in Source

| UNIT_ID | X_ID | UG_ID | UNIT_CODE |
|---|---|---|---|
| 1002 | 57 | 19 | M2/UOM |
| 1003 | 58 | 20 | kg |

M_UNIT_GROUPS in Source

| UG_ID | UG_CODE |
|---|---|
| 19 | AREA |
| 20 | WEIGHT |
| 21 | VOLUME |

X in Source

| X_ID | X_CODE |
|---|---|
| 57 | SPACIAL |
| 58 | PHYSICAL |

M_UNITS in Target

| UNIT_ID | X_ID | UG_ID | UNIT_CODE |
|---|---|---|---|
| 1006 | 67 | 21 | M2/UOM |

M_UNIT_GROUPS in Target

| UG_ID | UG_CODE |
|---|---|
| 21 | AREA |
| 69 | WEIGHT |

X in Target

| X_ID | X_CODE |
|---|---|
| 67 | SPACIAL |
| 68 | PHYSICAL |

FIG. 27

M_UNITS in Source

| UNIT_ID | X_ID | UG_ID | UNIT_CODE |
|---|---|---|---|
| 1002 | 57 | 19 | M2/UOM |
| 1003 | 58 | 20 | kg |

M_UNIT_GROUPS in Source

| UG_ID | UG_CODE |
|---|---|
| 19 | AREA |
| 20 | WEIGHT |
| 21 | VOLUME |

X in Source

| X_ID | X_CODE |
|---|---|
| 57 | SPACIAL |
| 58 | PHYSICAL |

M_UNITS in Target

| UNIT_ID | X_ID | UG_ID | UNIT_CODE |
|---|---|---|---|
| 1006 | 67 | 21 | M2/UOM |
| 1007 | 68 | 69 | kg |

M_UNIT_GROUPS in Target

| UG_ID | UG_CODE |
|---|---|
| 21 | AREA |
| 69 | WEIGHT |

X in Target

| X_ID | X_CODE |
|---|---|
| 67 | SPACIAL |
| 68 | PHYSICAL |

SYSTEM AND METHOD FOR COMPARING AND SELECTIVELY MERGING DATABASE RECORDS

CROSS-REFERENCE TO RELATED APPLICATION(S)

This application claims priority from Indian Patent Application No. 201841022589 entitled SYSTEM AND METHOD FOR COMPARING AND SELECTIVELY MERGING DATABASE RECORDS filed in India on Jun. 16, 2018, which is hereby incorporated herein by reference in its entirety.

FIELD OF THE INVENTION

The present invention relates generally to database system and, more particularly, to comparing and selectively merging database records from a source database to a second database.

BACKGROUND OF THE INVENTION

Databases store data for various objects. In some databases, data associated with a particular object can be spread across multiple relational database tables, where one relational database table can cross-reference to one or more other relational database tables (referred to herein for convenience as a parent table or dependency).

SUMMARY OF EXEMPLARY EMBODIMENTS

In accordance with one embodiment of the invention, a method, database system, and computer program product allows for merging an object from a source database to a target database, where the object is associated with data stored in a plurality of relational database tables in the source database. Such merging involves obtaining a primary key for the object; querying the source database using the primary key for the object to obtain a primary key value from a first relational database table; identifying a parent object associated with the object, the parent object associated with a second relational database table; obtaining a parent key for the parent object; querying the source database using the parent key to obtain a parent key value from the second relational database; querying the target database using the parent key value to determine whether the parent key value exists in a parent object record in the target database; when the parent key value does not exist in a parent object record in the target database, adding the parent object record to the target database including the parent key value; and adding an object record to the target database including the primary key value and a reference to the parent key value in the parent key record.

In various alternative embodiments, querying the source database using the parent key to obtain a parent key value from the second relational database may involve joining the first and second relational database tables. Adding the parent object record to the target database including the parent key value may involve assigning an identifier for the parent key value, wherein the identifier is unique within the target database and is different than a corresponding identifier for the parent key value in the source database, in which case the reference to the parent key value may include the unique identifier assigned for the parent key value. Adding the object record to the target database may involve assigning an identifier for the primary key value, wherein the identifier is unique within the target database and is different than a corresponding identifier for the primary key value in the source database, and when the parent key value does exist in a parent object record in the target database, the reference to the parent key value may include an identifier associated with the existing parent key value.

In any of the above-described embodiments, merging may involve maintaining a configuration file that describes the data stored in the plurality of relational database tables including the primary key for the object and relationships between the plurality of relational database tables, wherein the primary key for the object, identification of the parent object, and the parent key are obtained from the configuration file. Additional embodiments may be disclosed and claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing features of embodiments will be more readily understood by reference to the following detailed description, taken with reference to the accompanying drawings, in which:

FIG. 1 shows an example GUI front-end display showing representations of various units associated with a unit group called CURRENCY.

FIG. 2 shows an example table named M_UNITS that defines various units such as currencies, weights, etc., in accordance with one exemplary embodiment.

FIG. 3 is an example Unit Group table named M_UNIT-_GROUPS in accordance with one exemplary embodiment.

FIG. 4 shows example Source and Target database states including a mismatch in UNIT_ID values, in accordance with an exemplary embodiment.

FIG. 5 shows example Source and Target database states including parent dependencies, in accordance with an exemplary embodiment.

FIG. 6 shows example Source and Target database states including a mismatch in UG_ID values, in accordance with an exemplary embodiment.

FIG. 7 shows example Source and Target database states including a mismatch in UG_CODE values, in accordance with an exemplary embodiment.

FIG. 8 shows example Source and Target database states in which an object in the Source database does not exist in the Target database, in accordance with an exemplary embodiment.

FIG. 9 shows example Source and Target database states in which an object in the Target database does not exist in the Source database, in accordance with an exemplary embodiment.

FIG. 10 shows example Source and Target database states in which an object in the Source database does not exist in the Target database, in accordance with an exemplary embodiment.

FIG. 11 shows the results of the join operations for the Source and Target databases of FIG. 10, in accordance with an exemplary embodiment.

FIG. 12 shows example Source and Target database states upon adding UG_CODE=WEIGHT to the Target database based on the database states of FIGS. 10-11, in accordance with an exemplary embodiment.

FIG. 13 shows example Source and Target database states upon adding UNIT_CODE=kg to the Target database based on the database states of FIG. 12, in accordance with an exemplary embodiment.

FIG. 17 shows example Source and Target database states in which UG_CODE=WEIGHT exists in the Target database but UNIT-CODE=kg does not exist in the Target database, in accordance with an exemplary embodiment.

FIG. 18 shows example Source and Target database states upon adding UNIT_CODE=kg to the Target database based on the database states of FIG. 17, in accordance with an exemplary embodiment.

FIG. 19 shows an example in which a single base record in base table M_UNITS is associated with multiple records in an extension table M_UNIT_NLS, specifically extension table records with NLS_ID=1 and NLS_ID=2, in accordance with an exemplary embodiment.

FIG. 20 shows an example in which NLS_ID=1 is used as the default value, in accordance with the embodiment of FIG. 19.

FIG. 21 shows an example in which NLS_ID=2 is used as the default value, in accordance with the embodiment of FIG. 19.

FIG. 22 shows example database states in which there are multiple levels of dependencies that need to be addressed for both comparing and merging the databases, in accordance with an exemplary embodiment.

FIG. 23 shows example Source and Target database states upon adding X_CODE=PHYSICAL to the Target database based on the database states of FIG. 22, in accordance with an exemplary embodiment.

FIG. 24 shows example Source and Target database states upon adding UG_CODE=WEIGHT to the Target database based on the database states of FIG. 23, in accordance with an exemplary embodiment.

FIG. 25 shows example Source and Target database states upon adding UNIT_CODE=kg to the Target database based on the database states of FIG. 24, in accordance with an exemplary embodiment.

FIG. 26 shows example Source and Target database states in which an object has multiple dependencies at the same level, in accordance with an exemplary embodiment.

FIG. 27 shows example Source and Target database states upon adding X_CODE=PHYSICAL and UG_CODE=WEIGHT to the Target database based on the database states of FIG. 26, in accordance with an exemplary embodiment.

FIG. 28 shows example Source and Target database states upon adding UNIT_CODE=kg to the Target database based on the database states of FIG. 27, in accordance with an exemplary embodiment.

FIG. 32 is a screenshot showing an example Data Comparison window in which all displayed records are identical in both databases in accordance with an exemplary embodiment.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Figure 14:
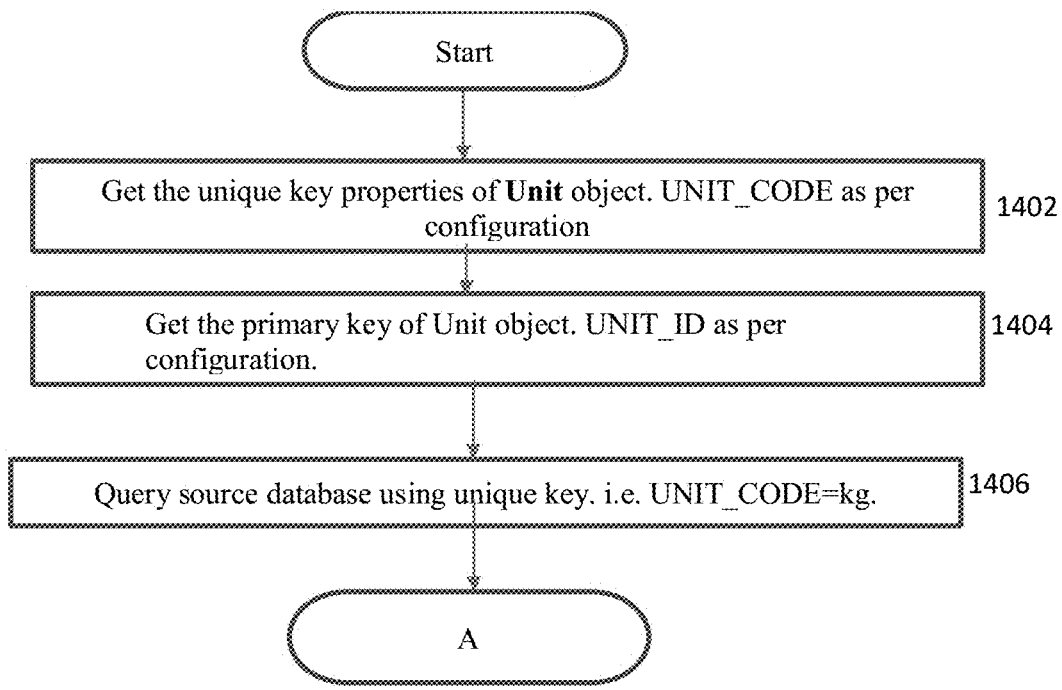
FIGS. 14-16 collectively form a flow chart for the merge process described with reference to FIGS. 10-13, in accordance with an exemplary embodiment.

Embodiments of the present invention allow a Source database and a Target database to be compared and merged in such a way that logically relevant data is considered and merged while ignoring irrelevant differences (e.g., object identifiers which in this context refers to the sequence number/identifier (ID) of database table) and that all dependencies across relational database tables are considered and merged. Some exemplary embodiments are discussed herein with reference to databases such as the Standard Database (SDB) for Intergraph Smart™ Reference Data product from Intergraph Corporation and are referred to generally as the "SDB Merge Tool," although the disclosed concepts can be applied more generally to other types of databases.

The technical problem underlying the invention can be seen as providing a way to automatically compare two databases, identify differences between the two databases, and merge mismatched data from one database (referred to herein as the "Source" database) to the other database (referred to herein as the "Target" database). Often, the data associated with logical (business) objects will be distributed across multiple relational database tables within the database (sometimes referred to as "normalization") such that multiple tables need to be accessed or merged in order to present a particular logical (business) object as a single record to users who do not understand the underlying database structures and design. Accordingly, exemplary embodiments define each logical (business) objects in a configuration file that lists the tables associated with the logical business object as well as the relationships between the tables. A record of a particular logical (business) entity can be formed using the information provided in the configuration file, e.g., by identifying the relevant tables and accessing or joining the tables in order to obtain all data needed for the record. Then, this record from one database can be compared with the other database. A graphical user interface can be provided to show how the two databases compare (e.g., identifying differences generally or in terms of specific types of differences). Differences can be shown, for example, side by side in a data grid view. From such a graphical user interface, users can cause data from the Source database to be merged into the Target database, for example, by selecting the mismatched record in the grid and saving the record to the Target database. Importantly, such merger of data from the Source database to the Target database maintains all dependencies across relational database tables.

The SDB Merge Tool is a web based tool which will provide functionality to view/compare two Standard Database (SDB) databases and provide the differences in a user intuitive data grid interface. User can go through the differences in a side-by-side data grid, select the data which needs to be merged and save the data into the database. The tool provides the flexibility to selectively merge and save required content from one database to other.

Some features of an exemplary SDB Merge Tool include:
Intuitive web based user interface to view the differences in a side-by-side data grid and merge required data from one SDB database to another.
Synchronous horizontal and vertical scroll, Filter, Sort, Column resize of both source and target grids.
Ability to automatically identify the mandatory parent dependencies required for merging the selected data into the target database. If a child business object is saved, the mandatory parent business object is also saved into the target database if it does not already exist in the target database.
Ability to select high level business objects and merge along with its child dependent data into target database.
Ability to configure the Business object hierarchy tree based on the data model.
Ability to report the data from both databases into an excel file. User can click on a node and report the data related to that object. The data is reported for each attribute value side by side. This enables to easily compare the data differences.

Example SDB System

Typically, a SDB system will include a relational database back-end in which data is stored in various relational database tables and a graphical user interface (GUI) front-end that allows users to visualize and manipulate data. Often, the GUI front-end hides many of the details of the data stored in the relational database tables. For example, a particular logical (business) object (e.g., a product such as a pipe) might be based on data (e.g., manufacturer, material, length, inside diameter, outside diameter, threading, cost, weight, etc.) that is spread across multiple relational database tables, but the GUI front-end typically allows the user to view and manipulate information about the object without the user having to know anything about the underlying tables or the way in which the data is stored in the tables.

For example, a particular SDB system might define various units for use in specifying logical (business) objects (e.g., currencies such as Australian dollars and Canadian dollars, weights such as kilograms and pounds, units of area such as square-meters and square-feet, etc.). Within the SDB back-end, the units may be stored in a relational database table (e.g., referred to herein as the "Unit" table). The SDB back-end may define various unit groups (e.g., units groups named "currency," "weight," "area," etc.) in a separate relational database table (e.g., referred to herein as the "Unit Group" table). The various units and unit groups might be assigned unique identifiers within the SDB (e.g., numeric identifiers). Each unit in the Unit table may be associated with one of the unit groups in the Unit Group table (e.g., the units Australian dollars and Canadian dollars might be associated with the unit group called "currency," the units kilograms and pounds might be associated with the unit group called "weight," the units square-meters and square-feet might be associated with the unit group called "area," etc.), such as by storing in the Unit table, for each unit, the identifier of the associated unit group from the Unit Group table.

FIG. 1 shows an example GUI front-end display showing representations of various units associated with a unit group called CURRENCY. Here, each unit has various properties that the user can see, including:
Unit Group
Unit
Short Desc
Description
Precision These properties are stored along with other data in various relational database tables in the SDB back-end.

FIG. 2 shows an example table named M_UNITS that defines various units such as currencies, weights, etc., in accordance with one exemplary embodiment. Here, the M_UNITS table includes the following columns:
UNIT_ID: Primary key. It is value of a sequence.
UG_ID: ID of Unit Group, which is persisted in a different table.
UNIT_CODE: Direct property. Unit
USR_ID: Direct property. Last Modified User
LMOD: Direct property. Last Modified Time
INT_REV: Direct property. No. of updates
PRECISION: Direct property. Precision
SDB_INFO: Direct property. SDB Info—users can add custom data in this field.

Note that the column UG_ID includes references to a separate Unit Group table (not shown). Specifically, the units kg/m and kg/1000 pc are associated with a Unit Group having a Unit Group ID (UG_ID) of 5012, the unit deg is associated with a Unit Group having a Unit Group ID (UG_ID) of 5008, the unit m2/UOM is associated with a Unit Group having a Unit Group ID (UG_ID) of 5000, and the units AED and AUD are associated with a Unit Group having a Unit Group ID (UG_ID) of 5007.

The M_UNITS table does not have data for the Unit Group properties. Therefore, data for the Unit Group properties needs to be obtained by joining with a Unit Group table. FIG. 3 is an example Unit Group table named M_UNIT_GROUPS in accordance with one exemplary embodiment. As in the M_UNITS table, the M_UNIT_GROUPS table typically would contain additional columns (not shown for convenience), including, for example:
Last Modified User
No. Of updates
Last Modified Time.

It is possible that some of the data needed for the M_UNIT_GROUPS table may have to be obtained by joining with one or more other tables.

Also, the M_UNITS table does not have data for the Short Desc and Description fields that are displayed in the GUI front-end display of FIG. 1, so this data would need to be obtained by joining with one or more other tables (e.g., accessed using the UNIT_ID field of the M_UNITS table).

It should be noted that the GUI front-end display of FIG. 1 hides information about the underlying relational database tables and how data is stored in the tables. Thus, users are able to work at an object level, while the SDB system handles all of the relational database operations behind the scenes.

Comparing Source and Target SDB Databases

From time to time, it may be necessary or desirable to compare two SDB databases. In this respect, the SDB Merge Tool needs to compare the meaning of the data rather than, for example, object identifiers, and needs to account for dependencies that extend across relational database tables. For example, assume that the Source and Target databases include the entries shown in FIG. 4. Note that the Source database associates UNIT_ID=5440 with UNIT_CODE=kg/m while the Target database associates UNIT_ID=5440 with UNIT_CODE=deg. Thus, it would appear that the two databases do not match with regard to this object. However, in exemplary embodiments, this identifier mismatch is not considered to be a mismatch between the two databases because the SDB Merge Tool compares UNIT_CODE to UNIT_CODE rather than UNIT_ID to UNIT_ID. Thus, in this example, the SDB Merge Tool compares (UNIT_CODE=kg/m, UNIT_ID=5440) with (UNIT_CODE=kg/m, UNIT_ID=5304) and identifies a match instead of comparing (UNIT_CODE=kg/m, UNIT_ID=5440) with (UNIT_CODE=deg, UNIT_ID=5440) and improperly identifying a mismatch.

In exemplary embodiments, the SDB Merge Tool has to go further in order to compare the two databases, particularly when objects have dependencies across relational database tables, such as the dependency between units in the M_UNITS table and unit groups in the M_UNIT_GROUPS table in the above example. Assume now that the Source and Target databases including the entries shown in FIG. 5. Here, the SDB Merge Tool can determine not only that UNIT_CODE=kg/m exists in both databases but also that each database associates UNIT_CODE=kg/m with a unit group having a UG_CODE=WEIGHT. Thus, the SDB Merge Tool can determine that the two databases match with respect to this object.

Similarly, the SDB Merge Tool can determine not only that UNIT_CODE=deg exists in both databases but also that each database associates UNIT_CODE=deg with a unit group having a UG_CODE=TEMPERATURE. Thus, the SDB Merge Tool can determine that the two databases match with respect to this object.

In order to perform such comparisons, the SDB Merge Tool must obtain the logical data associated with each logical (business) object by joining the appropriate tables. In the above example, for instance, in order to obtain the logical data associated with units kg/m and deg, the SDB Merge Tool has to join the M_UNITS and M_UNIT_GROUPS tables.

Similar to the situation above in which the UNIT_IDs for unit kg/m did not match in the two databases, it is possible that the UG_IDs for a unit group will not match. Assume that the Source and Target databases including the entries shown in FIG. 6. Here, even though the unit group identifiers for WEIGHT and TEMPERATURE in the Target database do not match the unit group identifiers in the Source database, the SDB Merge Tool can determine not only that UNIT_CODE=kg/m exists in both databases but also that each database associates UNIT_CODE=kg/m with a unit group having a UG_CODE=WEIGHT, because the SDB Merge Tool compares the unit codes rather than the unit identifiers. Thus, the SDB Merge Tool can determine that the two databases match with respect to this object.

Similarly, the SDB Merge Tool can determine not only that UNIT_CODE=deg exists in both databases but also that each database associates UNIT_CODE=deg with a unit group having a UG_CODE=TEMPERATURE, because the SDB Merge Tool compares the unit codes rather than the unit identifiers. Thus, the SDB Merge Tool can determine that the two databases match with respect to this object.

It is also possible that a particular unit will match in the two databases but the parent dependencies (i.e., unit group, in this example) will not match. Assume that the Source and Target databases include the entries shown in FIG. 7. Here, the unit with UNIT_CODE=deg exists in both databases but is associated with unit group TEMPERATURE in the Source database and with unit group ANGLE in the Target database. Since the SDB Merge Tool compares the object including all of its dependencies, the SDB database can identify the mismatch when it compares the user groups for the unit having UNIT_CODE=deg.

Of course, it is also possible for there to be an object in the Source database that does not exist in the Target database. Assume that the Source and Target databases include the entries shown in FIG. 8. Here, the Target database does not include the unit with UNIT_CODE=deg. The SDB Merge Tool can identify this mismatch when it searches in the Target database for the unit with UNIT_CODE=deg.

Similarly, it is also possible for there to be an object in the Target database that does not exist in the Source database. Assume that the Source and Target databases include the entries shown in FIG. 9. Here, the Source database does not include the unit with UNIT_CODE=deg. The SDB Merge Tool can identify this mismatch when it searches in the Source database for the unit with UNIT_CODE=deg from the Target database or by otherwise identifying any objects in the Target database that were not accessed when comparing objects from the Source database to the Target database.

Thus, during a comparison of the two databases, each logical (business) object can be classified into one of the following difference categories:

Identical—The object exists in both source database and target database and all the properties are matching in both databases.

Source Only—The object exists in source database but do not exist in target database.

Target Only—The object exists in target database but do not exist in source database.

Different—The object exists in both source database and target database but few properties not matching.

Configuration Files

As mentioned above, in order to obtain the logical data associated with each logical (business) object so that the databases can be compared, the SDB Merge Tool may have to join multiple tables. In typical SDB databases, it would be impractical to write and maintain SQL queries comparing all logical objects associated with a SDB database. Thus, in exemplary embodiments, the SDB Merge Tool maintains configuration files that define the logical object structures of the SDB database including logical dependencies. The SDB Merge Tool generates, from the configuration files, executable queries in the form of dynamic insert and update scripts for comparing and copying database objects.

In an exemplary embodiment, each logical (business) object is defined by a BODefinition element that contains the name of the object, the base table for fetching data from the database, and an optional display name to show in user interface. It also defines lists of properties, a primary key, and unique properties.

The following is an example BODefinition definition in accordance with an exemplary embodiment:
Name: Attribute that defines Name of logical object. It is unique for entire configuration.

BaseTable: Attribute that defines Primary table in database where object data is defined.
DisplayName: Optional attribute that defines Name to be shown in user interface. If not defined, value of Name is used.
PrimaryKey: Element that defines primary key of logical object.
UniqueKey: Element that defines unique key of logical object.
Properties: Element that defines properties of logical object The following is an example PrimaryKey definition in accordance with an exemplary embodiment:
PrimaryKey: Element that defines primary key of base table. It contains list of columns that are part of primary key
PrimaryKeyColumn: Element that defines primary column.
Column of PrimaryKeyColumn: Attribute that defines column name.
Sequence of PrimaryKeyColumn: Attribute that defines sequence used getting next value. It is optional if the column is defined as primary key in parent table.

The following is an example UniqueKey definition in accordance with an exemplary embodiment:
UniqueKey: Element that defines properties that of part of unique key of logical object.
It contains list of properties that are part of unique key
UniqueProperty: Element that defines unique property.
Name of UniqueProperty: Attribute that defines the name of unique property.

The following is an example Properties definition in accordance with an exemplary embodiment:
Properties: Element that defines properties of logical object. It contains a list of property elements.
Property: Element that defines an individual property of logical object.
Name of Property: Attribute that defines name of property.
DbColumn of Property: Attribute that defines database column in which data for the property is defined.
UseForComparison of Property: Attribute that defines whether property should be used for comparison of logical object.
ExtensionColumn of Property: Attribute that defines column name of extended table in which data is defined.
ExtensionTable or Property: Attribute that defines name of table which contains additional information of logical object apart from base table. This can be used defining extension table relations when only column is required for joining extension table and column name in both extension and base table are same. Otherwise use Extension element.
ParentName of Property: Attribute that defines name of column in parent object in which data is defined.
ParentBO of Property: Attribute that defines name of parent logical object. In which actual data is defined. This can be used defining when only one level parent hierarchy is required and column name in both parent table and base table are same. Otherwise use Parent element. This allows short hand definition of parent relation.

The following is an example Join definition in accordance with an exemplary embodiment:
Join: Element that defines how to join two tables.
Column of Join: Attribute that defines joining column from base table.
JoinColumn of Join: Attribute that defines joining column from parent/extension table.
DefaultValue of Join: Attribute that defines a default record to use in a join operation when an extension table defines multiple records of data for a single base table record. FIG. 19 shows an example in which a single base record in base table M_UNITS is associated with multiple records in an extension table M_UNIT_NLS, specifically extension table records with NLS_ID=1 and NLS_ID=2. The default value specifies which extension table record should be used in the event the user does not specify the extension table record. FIG. 20 shows an example in which NLS_ID=1 is used as the default value. FIG. 21 shows an example in which NLS_ID=2 is used as the default value.

Example Configuration File Schema

The following is an example configuration file schema for configuration xml in accordance with an exemplary embodiment:

```
<?xml version="1.0"encoding="utf-8"?>
<xs:schema attributeFormDefault="unqualified" elementFormDefault="qualified"
xmlns:xs="http://www.w3.org/2001/XMLSchema">
    <xs:element name="BODefinitions">
        <xs:complexType>
            <xs:sequence>
                <xs:element maxOccurs="unbounded" name="BODefinition">
                    <xs:complexType>
                        <xs:all>
                            <xs:element name="PrimaryKey">
                                <xs:complexType>
                                    <xs:sequence>
                                        <xs:element name="PrimaryKeyColumn" minOccurs="0"
maxOccurs="unbounded">
                                            <xs:complexType>
                                                <xs:attribute name="Column" type="xs:string" use="required" />
                                                <xs:attribute name="Sequence" type="xs:string" use="optional" />
                                            </xs:complexType>
                                        </xs:element>
                                    </xs:sequence>
                                </xs:complexType>
                            </xs:element>
                            <xs:element name="UniqueKey">
                                <xs:complexType>
                                    <xs:sequence>
                                        <xs:element name="UniqueProperty" maxOccurs="unbounded"
minOccurs="1">
                                            <xs:complexType>
                                                <xs:attribute name="Name" type="xs:string" use="required" />
```

```
                    </xs:complexType>
                  </xs:element>
                </xs:sequence>
              </xs:complexType>
            </xs:element>
            <xs:element name="Properties">
              <xs:complexType>
                <xs:sequence>
                  <xs:element maxOccurs="unbounded" name="Property">
                    <xs:complexType>
                      <xs:sequence minOccurs="0">
                        <xs:element minOccurs="0" name="Extension" maxOccurs="1">
                          <xs:complexType>
                            <xs:sequence>
                              <xs:element name="Join" maxOccurs="unbounded" minOccurs="1">
                                <xs:complexType>
                                  <xs:attribute name="Column" type="xs:string" use="required" />
                                  <xs:attribute name="JoinColumn" type="xs:string" use="required" />
                                  <xs:attribute name="DefaultValue" type="xs:unsignedByte" use="optional" />
                                </xs:complexType>
                              </xs:element>
                            </xs:sequence>
                            <xs:attribute name="ExtensionTable" type="xs:string" use="required" />
                          </xs:complexType>
                        </xs:element>
                        <xs:element minOccurs="0" name="Parent" maxOccurs="unbounded">
                          <xs:complexType>
                            <xs:sequence>
                              <xs:element name="Join" maxOccurs="unbounded" minOccurs="1">
                                <xs:complexType>
                                  <xs:attribute name="Column" type="xs:string" use="required" />
                                  <xs:attribute name="JoinColumn" type="xs:string" use="required" />
                                </xs:complexType>
                              </xs:element>
                            </xs:sequence>
                            <xs:attribute name="ParentBO" type="xs:string" use="required" />
                          </xs:complexType>
                        </xs:element>
                      </xs:sequence>
                      <xs:attribute name="Name" type="xs:string" use="required" />
                      <xs:attribute name="UseForComparison" type="xs:boolean" use="optional" default="true"/>
                      <xs:attribute name="DbColumn" type="xs:string" use="optional" />
                      <xs:attribute name="ExtensionColumn" type="xs:string" use="optional" />
                      <xs:attribute name="ExtensionTable" type="xs:string" use="optional" />
                      <xs:attribute name="ParentName" type="xs:string" use="optional" />
                      <xs:attribute name="ParentBO" type="xs:string" use="optional" />
                    </xs:complexType>
                  </xs:element>
                </xs:sequence>
              </xs:complexType>
            </xs:element>
          </xs:all>
          <xs:attribute name="Name" type="xs:string" use="required" />
          <xs:attribute name="BaseTable" type="xs:string" use="required" />
          <xs:attribute name="DisplayName" type="xs:string" use="optional" />
        </xs:complexType>
      </xs:element>
    </xs:sequence>
  </xs:complexType>
</xs:element>
</xs:schema>
```

Example Configuration File

The following is an example configuration file for the types of relational database tables used in the examples shown and described with reference to FIGS. 1-9:

```
<?xml version="1.0" encoding="utf-8"?>
<BODefinitions>
  <BODefinition Name="UnitGroup" BaseTable="M_UNIT_GROUPS">
    <PrimaryKey>
```

-continued

```
      <PrimaryKeyColumn Column="UG_ID" Sequence="M_SEQ_UG_ID"/>
    </PrimaryKey>
    <UniqueKey>
      <UniqueProperty Name="UG_CODE"/>
    </UniqueKey>
    <Properties>
      <Property Name="UG_CODE" DbColumn="UG_CODE"/>
      <Property Name="SHORT_DESC" ExtensionColumn="SHORT_DESC">
        <Extension ExtensionTable="M_UNIT_GROUP_NLS">
          <Join Column="UG_ID" JoinColumn="UG_ID"/>
          <Join Column="NLS_ID" JoinColumn="NLS_ID" DefaultValue="1"/>
        </Extension>
      </Property>
      <Property Name="DESCRIPTION" ExtensionColumn="DESCRIPTION" >
        <Extension ExtensionTable="M_UNIT_GROUP_NLS">
          <Join Column="UG_ID" JoinColumn="UG_ID"/>
          <Join Column="NLS_ID" JoinColumn="NLS_ID" DefaultValue="1"/>
          </Extension>
        </Property>
        <Property Name="SDB_INFO" DbColumn="SDB_INFO"/>
        <Property Name="USR_ID" DbColumn="USR_ID" UseForComparison="false"/>
        <Property Name="LMOD" DbColumn="LMOD" UseForComparison="false"/>
        <Property Name="INT_REV" DbColumn="INT_REV" UseForComparison="false"/>
    </Properties>
  </BODefinition>
  <BODefinition Name="Unit" BaseTable="M_UNITS" DisplayName="Unit">
    <PrimaryKey>
      <PrimaryKeyColumn Column="UNIT_ID" Sequence="M_UNIT_ID"/>
    </PrimaryKey>
    <UniqueKey>
      <UniqueProperty Name="UNIT_CODE"/>
    </UniqueKey>
    <Properties>
      <Property Name="UNIT_CODE" DbColumn="UNIT_CODE"/>
      <Property Name="UG_CODE" ParentName="UG_CODE" ParentBO="UnitGroup" DbColumn="UG_ID">
        <Parent ParentBO="UnitGroup">
          <Join Column="UG_ID" JoinColumn="UG_ID"/>
        </Parent>
      </Property>
      <Property Name="SHORT_DESC" ExtensionColumn="SHORT_DESC">
        <Extension ExtensionTable="M_UNIT_NLS">
          <Join Column="UNIT_ID" JoinColumn="UNIT_ID"/>
          <Join Column="NLS_ID" JoinColumn="NLS_ID" DefaultValue="1"/>
        </Extension>
      </Property>
      <Property Name="DESCRIPTION" ExtensionColumn="DESCRIPTION">
        <Extension ExtensionTable="M_UNIT_NLS">
          <Join Column="UNIT_ID" JoinColumn="UNIT ID"/>
          <Join Column="NLS_ID" JoinColumn="NLS_ID" DefaultValue="1"/>
        </Extension>
      </Property>
      <Property Name="PRECISION" DbColumn="PRECISION"/>
      <Property Name="SDB_INFO" DbColumn="SDB_INFO"/>
      <Property Name="USR_ID" DbColumn="USR_ID" UseForComparison="false"/>
      <Property Name="LMOD" DbColumn="LMOD" UseForComparison="false"/>
      <Property Name="INT_REV" DbColumn="INT_REV" UseForComparison="false"/>
    </Properties>
  </BODefinition>
  <BODefinition Name="UnitTypeDetail" BaseTable="M_UNIT_TYPE_DETAILS" DisplayName="Unit Type Detail">
    <PrimaryKey>
      <PrimaryKeyColumn Column="UTYPD_ID" Sequence="M_SEQ_UTYPD_ID"/>
    </PrimaryKey>
    <UniqueKey>
      <UniqueProperty Name="UTYP_CODE"/>
      <UniqueProperty Name="UNIT_CODE"/>
    </UniqueKey>
    <Properties>
      <Property Name="UTYP_CODE" DbColumn="UTYP_ID" ParentBO="UnitType"/>
      <Property Name="UG_CODE" ParentName="UG_CODE" ParentBO="">
        <Parent ParentBO="Unit">
        <Join Column="UNIT_ID" JoinColumn="UNIT_ID"/>
        </Parent>
        <Parent ParentBO="UnitGroup">
```

```
            <Join Column="UG_ID" JoinColumn="UG ID"/>
         </Parent>
      </Property>
      <Property Name="UNIT_CODE" DbColumn="UNIT ID" ParentBO="Unit"
UseForComparison="false"/>
      <Property Name="SHORT_DESC" ExtensionColumn="DESCRIPTION">
         <Extension ExtensionTable="M_UNIT_NLS">
            <Join Column="UNIT_ID" JoinColumn="UNIT_ID"/>
            <Join Column="NLS_ID" JoinColumn="NLS_ID" DefaultValue="1"/>
         </Extension>
      </Property>
      <Property Name="DESCRIPTION" ExtensionColumn="DESCRIPTION"
UseForComparison="false">
         <Extension ExtensionTable="M_UNIT_NLS">
            <Join Column="UNIT_ID" JoinColumn="UNIT_ID"/>
            <Join Column="NLS_ID" JoinColumn="NLS_ID" DefaultValue="1"/>
         </Extension>
      </Property>
      <Property Name="USR_ID" DbColumn="USR_ID" UseForComparison="false"/>
      <Property Name="LMOD" DbColumn="LMOD" UseForComparison="false"/>
      <Property Name="INT_REV" DbColumn="INT_REV"
UseForComparison="false"/>
   </Properties>
</BODefinition>
```

Note that the following fields are not used for comparison purposes in this configuration file (i.e., all have UseForComparison="false"):

```
UNIT_CODE
DESCRIPTION
USER_ID
LMOD
INT_REV
```

Query Generation for Comparing and Merging

Using the BODefinition defined in the configuration file, the SDB Merge Tool dynamically prepares appropriate SQL queries to fetch the data associated with a logical (business) object and to compare data from both databases and appropriately classify data objects, as discussed in greater detail below.

The following are some examples of generating queries to retrieve data associated with logical objects. In these examples, BaseTable is the main table for the business object and is given an alias e.g. bt. The top level query is formed as follows:

select {column_list} from M_UNITS bt

The column list arrived as below. For each property, there is column with an alias in the column list. Example queries for retrieving data for different properties are shown below.

Case 1: Properties that are directly defined in base table. The DbColumn from base table is used as selector and Name can be used for alias.

e.g. <Property Name="UG_CODE" DbColumn="UG_CODE"/>

Column will be bt.UG_CODE UG CODE

Case 2: Properties that have value defined parent table joined by column, for example:

```
   e.g.
<Property Name="UG_CODE" ParentName="UG_CODE">
   <Parent ParentBO="UnitGroup">
      <Join Column="UG_ID" JoinColumn="UG_ID"/>
   </Parent>
</Property>
(select UG_CODE from M_UNIT_GROUPS where bt.UG_ID= UG_ID)
UG_CODE
```

ParentName value is selected from base table of ParentBO by joining columns from base table and parent table. Name value used as Alias.

If multiple parents exist they are joined in order to get value for the property, for example:

```
<Property Name="UG_CODE" ParentName="UG_CODE">
   <Parent ParentBO="Unit">
      <Join Column="UNIT_ID" JoinColumn="UNIT_ID"/>
   </Parent>
   <Parent ParentBO="UnitGroup">
      <Join Column="UG_ID" JoinColumn="UG_ID"/>
   </Parent>
</Property>
(select UG_CODE from M_UNIT_GROUPS
where (UG_ID) in
(select UG_ID from M_UNITS where bt.UNIT_ID=UNIT_ID)
) UG_CODE
```

Case 3: Properties that are defined in extension tables. Extension Column is selected from Extension table by joining columns of base table and extension tables. Name value used as alias, for example:

```
<Property Name="SHORT_DESC" ExtensionColumn=
"SHORT_DESC">
   <Extension ExtensionTable="M_UNIT_NLS">
      <Join Column="UNIT_ID" JoinColumn="UNIT_ID"/>
      <Join Column="NLS_ID" JoinColumn="NLS_ID"
         DefaultValue="1"/>
   </Extension>
</Property>
(select SHORT_DESC from M_UNIT_NLS where bt.UNIT_ID=
UNIT_ID and NLS_ID=1) SHORT_DESC
```

The database functionality of union, intersect and minus are used to compare data and classify logical objects. Specifically, database links are created to connect one database to the other database (i.e. source to target and target to source). While querying tables, suffix or prefix can be added to table name, e.g., table@remote_link, remote_link.table.

The following notation is used in the following "skeleton" queries for various difference categories:
- all_properties is column list containing all properties
- compare_properties is column list containing properties that are comparable
- unique_properties is column list containing properties that are part of unique key
- null columns is column list which defines null values. This is used match number of columns in all sub queries of union query.

Identical query

```
Select all_properties from table
Where (compare_properties) in
(
    Select compare_properties from table
    intersect
    Select compare_properties from remote_table)
Select all_properties from table
Where (unique_properties) in
(
    Select unique_properties from table
    minus
    Select unique_properties from remote_table)
```

Source only query

```
Select all_properties from table
Where (unique_properties) in
(
    Select unique_properties from table
    minus
    Select unique_properties from remote_table)
```

Target only query

```
Select null_columns from remote_table
Where (unique_properties) in
(
    Select unique_properties from remote_table
    minus
    Select unique_properties from table)
```

Differences query

```
Select all_properties from table
Where (unique_properties) in
(
    (select unique_properties from table
    intersect
    Select unique_properties from remote_table)
    Minus
    (select compare_properties from table
    intersect
    Select compare_properties from remote table)
)
```

To get the records of all categories, all above queries can be combined using union or individual category results can be queried. Based on Relational Database Management Systems, the queries can have variations and can be tuned for better performance.

The following is an example query for comparing and fetching data from the Source SDB database:

```sql
SELECT ROWNUM, final1.*
FROM ( (SELECT 1 diff_cat, ROWNUM rownum2, src.*
    FROM (SELECT 'UNIT_CODE' || unit_code AS unique_combi,
        src_wo_uc.*
      FROM (SELECT bt.unit_code unit_code,
          (SELECT ug_code
            FROM m_unit_groups
            WHERE bt.ug_id = ug_id)
            ug_code,
          (SELECT short_desc
            FROM m_unit_nls
            WHERE bt.unit_id = unit_id AND 1 = nls_id)
            short_desc,
          (SELECT description
            FROM m_unit_nls
            WHERE bt.unit_id = unit_id AND 1 = nls_id)
            description,
          bt.precision precision,
          bt.sdb_info sdb_info,
          bt.usr_id usr_id,
          bt.lmod lmod,
          bt.int_rev int_rev,
          ug_id ug_id,
```

```
              unit_id unit_id
        FROM m_units bt
        WHERE (ug_id) IN (SELECT ug_id
                FROM m_unit_groups
                WHERE ug_code IN ( :ug_code)))
    src_wo_uc) src,
    (SELECT 'UNIT_CODE' || unit_code AS unique_combi, dt_wo_uc.*
      FROM ( (SELECT bt.unit_code unit_code,
              (SELECT ug_code
              FROM
m_unit_groups@dblink4cf7bcfd28c5419b898f7221acbb7b94
                WHERE bt.ug_id = ug_id)
                ug_code,
              (SELECT short_desc
                FROM m_unit_nls@dblink4cf7bcfd28c5419b898f7221acbb7b94
                WHERE    bt.unit_id = unit_id
                  AND 1 = nls_id)
                short_desc,
              (SELECT description
                FROM m_unit_nls@dblink4cf7bcfd28c5419b898f7221acbb7b94
                WHERE    bt.unit_id = unit_id
                  AND 1 = nls_id)
                description,
          bt.precision precision,
          bt.sdb_info sdb_info
        FROM m_units@dblink4cf7bcfd28c5419b898f7221acbb7b94 bt
        WHERE (ug_id) IN
              (SELECT ug_id
              FROM
m_unit_groups@dblink4cf7bcfd28c5419b898f7221acbb7b94
                WHERE ug_code IN ( :ug_code)))
```

```
            INTERSECT
            (SELECT bt.unit_code unit_code,
                (SELECT ug_code
                  FROM m_unit_groups
                 WHERE bt.ug_id = ug_id)
                ug_code,
                (SELECT short_desc
                  FROM m_unit_nls
                 WHERE bt.unit_id = unit_id AND 1 = nls_id)
                short_desc,
                (SELECT description
                  FROM m_unit_nls
                 WHERE bt.unit_id = unit_id AND 1 = nls_id)
                description,
                bt.precision precision,
                bt.sdb_info sdb_info
              FROM m_units bt
             WHERE (ug_id) IN (SELECT ug_id
                        FROM m_unit_groups
                       WHERE ug_code IN ( :ug_code))))
           dt_wo_uc) dt
     WHERE dt.unique_combi = src.unique_combi)
UNION
(SELECT 2 diff_cat, ROWNUM rownum2, dt.*
   FROM (SELECT src.*
           FROM (SELECT 'UNIT_CODE' || unit_code AS unique_combi,
                    src_wo_uc.*
                   FROM (SELECT bt.unit_code unit_code,
                          (SELECT ug_code
                            FROM m_unit_groups
                           WHERE bt.ug_id = ug_id)
```

```
            ug_code,
        (SELECT short_desc
          FROM m_unit_nls
          WHERE   bt.unit_id = unit_id
            AND 1 = nls_id)
          short_desc,
        (SELECT description
          FROM m_unit_nls
          WHERE   bt.unit_id = unit_id
            AND 1 = nls_id)
          description,
        bt.precision precision,
        bt.sdb_info sdb_info,
        bt.usr_id usr_id,
        bt.lmod lmod,
        bt.int_rev int_rev,
        ug_id ug_id,
        unit_id unit_id
      FROM m_units bt
      WHERE (ug_id) IN
            (SELECT ug_id
              FROM m_unit_groups
              WHERE ug_code IN ( :ug_code)))
      src_wo_uc) src
WHERE NOT EXISTS
      (SELECT ut.unique_combi
        FROM (SELECT 'UNIT_CODE' || unit_code
              AS unique_combi
            FROM (SELECT bt.unit_code unit_code
              FROM
m_units@dblink4cf7bcfd28c5419b898f7221acbb7b94 bt
```

```
            WHERE (ug_id) IN
               (SELECT ug_id
                 FROM
m_unit_groups@dblink4cf7bcfd28c5419b898f7221acbb7b94
                   WHERE ug_code IN
                      ( :ug_code))))
         ut
            WHERE ut.unique_combi = src.unique_combi)) dt)
UNION
(SELECT 4 diff_cat,
    ROWNUM rownum2,
    NULL,
    NULL,
    NULL,
    NULL,
    NULL,
    NULL,
    NULL,
    NULL,
    NULL,
    NULL,
    NULL,
    NULL
      FROM (SELECT 'UNIT_CODE' || unit_code AS unique_combi
         FROM (SELECT bt.unit_code unit_code,
            (SELECT ug_code
              FROM
m_unit_groups@dblink4cf7bcfd28c5419b898f7221acbb7b94
               WHERE bt.ug_id = ug_id)
              ug_code,
            (SELECT short_desc
```

```
            FROM m_unit_nls@dblink4cf7bcfd28c5419b898f7221acbb7b94
          WHERE bt.unit_id = unit_id AND 1 = nls_id)
          short_desc,
        (SELECT description
          FROM m_unit_nls@dblink4cf7bcfd28c5419b898f7221acbb7b94
          WHERE bt.unit_id = unit_id AND 1 = nls_id)
          description,
        bt.precision precision,
        bt.sdb_info sdb_info,
        bt.usr_id usr_id,
        bt.lmod lmod,
        bt.int_rev int_rev,
        ug_id ug_id,
        unit_id unit_id
      FROM m_units@dblink4cf7bcfd28c5419b898f7221acbb7b94 bt
      WHERE (ug_id) IN
          (SELECT ug_id
          FROM
  m_unit_groups@dblink4cf7bcfd28c5419b898f7221acbb7b94
            WHERE ug_code IN ( :ug_code)))) tgt
    WHERE NOT EXISTS
      (SELECT src.unique_combi
        FROM (SELECT 'UNIT_CODE' || unit_code AS unique_combi
          FROM (SELECT bt.unit_code unit_code,
              (SELECT ug_code
                FROM m_unit_groups
                WHERE bt.ug_id = ug_id)
              ug_code,
              (SELECT short_desc
                FROM m_unit_nls
                WHERE    bt.unit_id = unit_id
```

```
                    AND 1 = nls_id)
                  short_desc,
                  (SELECT description
                    FROM m_unit_nls
                    WHERE    bt.unit_id = unit_id
                      AND 1 = nls_id)
                  description,
                  bt.precision precision,
                  bt.sdb_info sdb_info,
                  bt.usr_id usr_id,
                  bt.lmod lmod,
                  bt.int_rev int_rev,
                  ug_id ug_id,
                  unit_id unit_id
                FROM m_units bt
                WHERE (ug_id) IN
                    (SELECT ug_id
                      FROM m_unit_groups
                      WHERE ug_code IN
                        ( :ug_code))))
          src
        WHERE src.unique_combi = tgt.unique_combi))
UNION
(SELECT 8 diff_cat, ROWNUM rownum2, src.*
  FROM (SELECT 'UNIT_CODE' || unit_code AS unique_combi, src_wo_uc.*
    FROM (SELECT bt.unit_code unit_code,
          (SELECT ug_code
            FROM m_unit_groups
            WHERE bt.ug_id = ug_id)
          ug_code,
          (SELECT short_desc
```

```
            FROM m_unit_nls
            WHERE bt.unit_id = unit_id AND 1 = nls_id)
          short_desc,
        (SELECT description
          FROM m_unit_nls
          WHERE bt.unit_id = unit_id AND 1 = nls_id)
          description,
        bt.precision precision,
        bt.sdb_info sdb_info,
        bt.usr_id usr_id,
        bt.lmod lmod,
        bt.int_rev int_rev,
        ug_id ug_id,
        unit_id unit_id
      FROM m_units bt
      WHERE (ug_id) IN (SELECT ug_id
                FROM m_unit_groups
                WHERE ug_code IN ( :ug_code))
      ORDER BY ROWNUM) src_wo_uc) src,
    (SELECT dt_wo_uc.*
      FROM ( (SELECT dt.*
          FROM (SELECT 'UNIT_CODE' || unit_code
                AS unique_combi,
              dt2.*
              FROM (SELECT bt.unit_code unit_code,
                  (SELECT ug_code
                    FROM
m_unit_groups@dblink4cf7bcfd28c5419b898f7221acbb7b94
                    WHERE bt.ug_id = ug_id)
                  ug_code,
                  (SELECT short_desc
```

FROM
m_unit_nls@dblink4cf7bcfd28c5419b898f7221acbb7b94

WHERE bt.unit_id = unit_id

AND 1 = nls_id)

short_desc, (SELECT description

FROM m_unit_nls@dblink4cf7bcfd28c5419b898f7221acbb7b94

WHERE bt.unit_id = unit_id

AND 1 = nls_id)

description, bt.precision precision, bt.sdb_info sdb_info

FROM m_units@dblink4cf7bcfd28c5419b898f7221acbb7b94 bt

WHERE (ug_id) IN (SELECT ug_id

FROM m_unit_groups@dblink4cf7bcfd28c5419b898f7221acbb7b94

WHERE ug_code IN ( :ug_code))

ORDER BY ROWNUM) dt2) dt

WHERE EXISTS (SELECT unqe_cols_intrsct.unique_combi

FROM (SELECT bt_with_uc.unique_combi

FROM (SELECT 'UNIT_CODE'

|| unit_code

AS unique_combi

FROM ( (SELECT bt.unit_code

```
                unit_code
            FROM m_units bt
            WHERE (ug_id) IN
                (SELECT ug_id
                    FROM m_unit_groups
                    WHERE ug_code IN
                        ( :ug_code)))
                INTERSECT
                (SELECT bt.unit_code
                unit_code
            FROM
m_units@dblink4cf7bcfd28c5419b898f7221acbb7b94 bt
                WHERE (ug_id) IN
                    (SELECT ug_id
                    FROM
m_unit_groups@dblink4cf7bcfd28c5419b898f7221acbb7b94
                        WHERE ug_code IN
                            ( :ug_code)))))
                    bt_with_uc)
                unqe_cols_intrsct
                WHERE unqe_cols_intrsct.unique_combi =
                    dt.unique_combi))
    MINUS
    (SELECT 'UNIT_CODE' || unit_code AS unique_combi,
        dt2.*
    FROM ( (SELECT bt.unit_code unit_code,
            (SELECT ug_code
                FROM m_unit_groups
                WHERE bt.ug_id = ug_id)
            ug_code,
        (SELECT short_desc
```

```
                FROM m_unit_nls
                WHERE    bt.unit_id = unit_id
                    AND 1 = nls_id)
            short_desc,
            (SELECT description
                FROM m_unit_nls
                WHERE    bt.unit_id = unit_id
                    AND 1 = nls_id)
            description,
            bt.precision precision,
            bt.sdb_info sdb_info
        FROM m_units bt
        WHERE (ug_id) IN
            (SELECT ug_id
                FROM m_unit_groups
                WHERE ug_code IN ( :ug_code)))
    INTERSECT
        (SELECT bt.unit_code unit_code,
            (SELECT ug_code
                FROM m_unit_groups@dblink4cf7bcfd28c5419b898f7221acbb7b94
                WHERE bt.ug_id = ug_id)
            ug_code,
            (SELECT short_desc
                FROM m_unit_nls@dblink4cf7bcfd28c5419b898f7221acbb7b94
                WHERE    bt.unit_id = unit_id
                    AND 1 = nls_id)
            short_desc,
            (SELECT description
```

FROM m_unit_nls@dblink4cf7bcfd28c5419b898f7221acbb7b94

WHERE bt.unit_id = unit_id

AND 1 = nls_id)

description, bt.precision precision, bt.sdb_info sdb_info

FROM m_units@dblink4cf7bcfd28c5419b898f7221acbb7b94 bt

WHERE (ug_id) IN (SELECT ug_id

FROM m_unit_groups@dblink4cf7bcfd28c5419b898f7221acbb7b94

WHERE ug_code IN ( :ug_code))))

dt2)) dt_wo_uc) dt3

WHERE dt3.unique_combi = src.unique_combi)) final1

ORDER BY diff_cat, unit_code

Example—Merge Object and Parent into Target

The following is an example of merging an object that exists in the Source database but not in the Target database. Assume that the Source and Target databases include the entries shown in FIG. 10. Here, the Source database includes a unit with UNIT_CODE=kg that does not exist in the Target database. For the sake of simplicity, only unique properties and primary key data is shown. As discussed above, this mismatch can be presented to a user through a graphical user interface. The user can choose to save the object from the Source database into the Target database, in which case the SDB Merge Tool merges the relevant data from the Source database into the Target database.

In an exemplary embodiment, the SDB Merge Tool first joins the appropriate tables based on the configuration files. FIG. 11 shows the results of the join operations for the Source and Target databases in accordance with this example.

Based on the results of the join operations, the SDB Merge Tool can recognize that the Unit with UNIT_CODE=kg exists in the Source database but not in the Target database. The SDB Merge Tool also can recognize that Unit with UNIT_CODE=kg has a parent in the Unit Group table with UG_CODE=WEIGHT but the Target database does not have a Unit Group with UG_CODE=WEIGHT. Thus, the SDB Merge Tool adds a Unit Group with UG_CODE=WEIGHT to the Target database, resulting in the database states shown in FIG. 12. Note that the Unit Group with UG_CODE=WEIGHT was added with a unit group identifier (UG_ID) of 22, which is unique within the Target database and is different than the UG_ID of 20 used for UG_CODE=WEIGHT in the Source database. This is because UG_ID=20 already may be in-use within the Target database in association with some other Unit Group.

After adding the Unit Group with UG_CODE=WEIGHT to the Target database, the SDB Merge Tool adds the Unit with UNIT_CODE=kg to the Target database, resulting in the database states shown in FIG. 13. Note that the Unit with UNIT_CODE=kg was added with a UNIT_ID=1007 that is unique within the Target database, as opposed to adding it with the UNIT_ID=1003 from the Source database. This is because UNIT_ID=1003 already may be in-use within the Target database in association with some other Unit.

As a result, the Source and Target databases now match with regard to this object. Note that the dependency of Unit Group was automatically inserted into the Target database along with the Unit.

Figure 15:
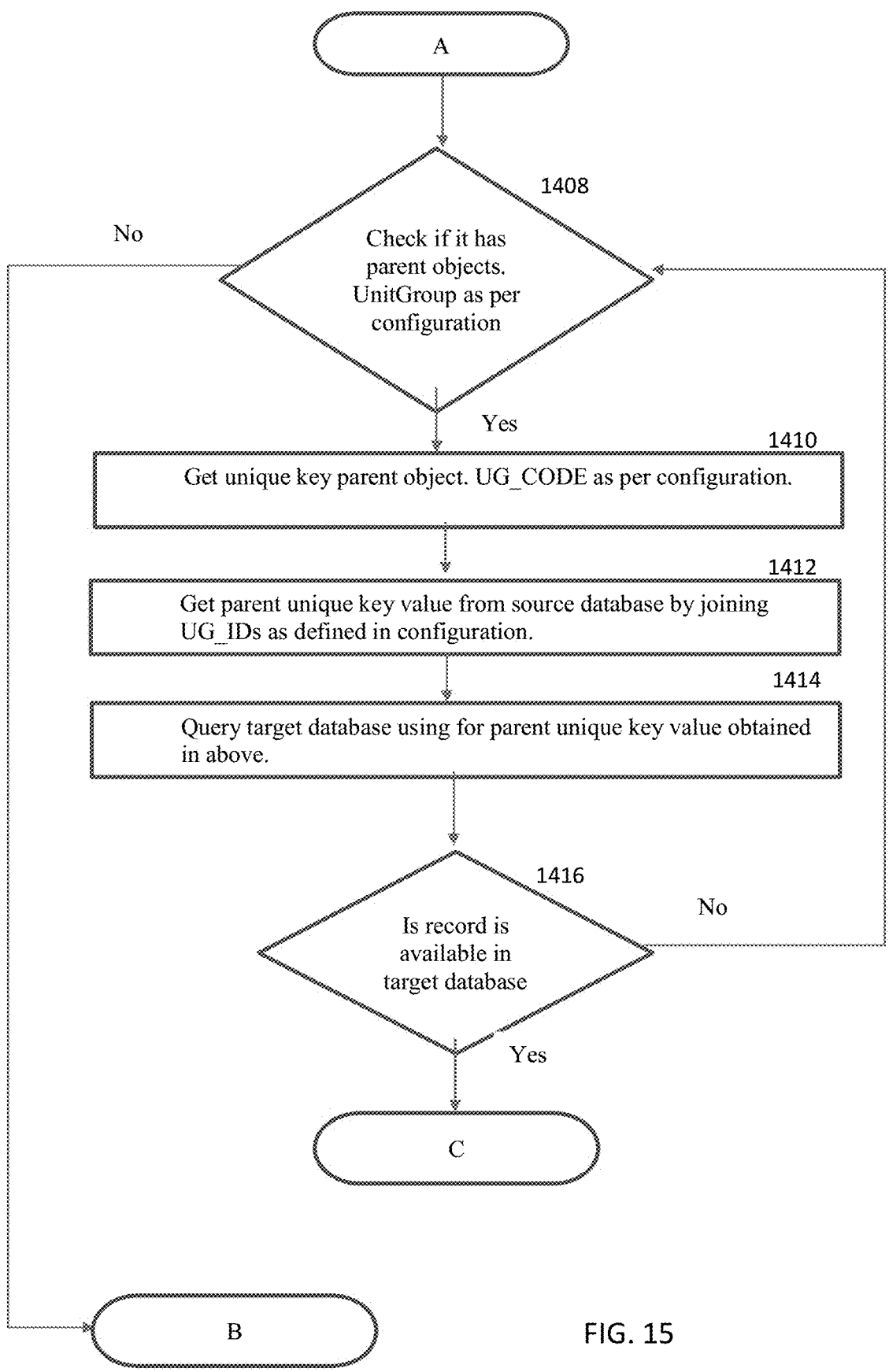
Figure 16:
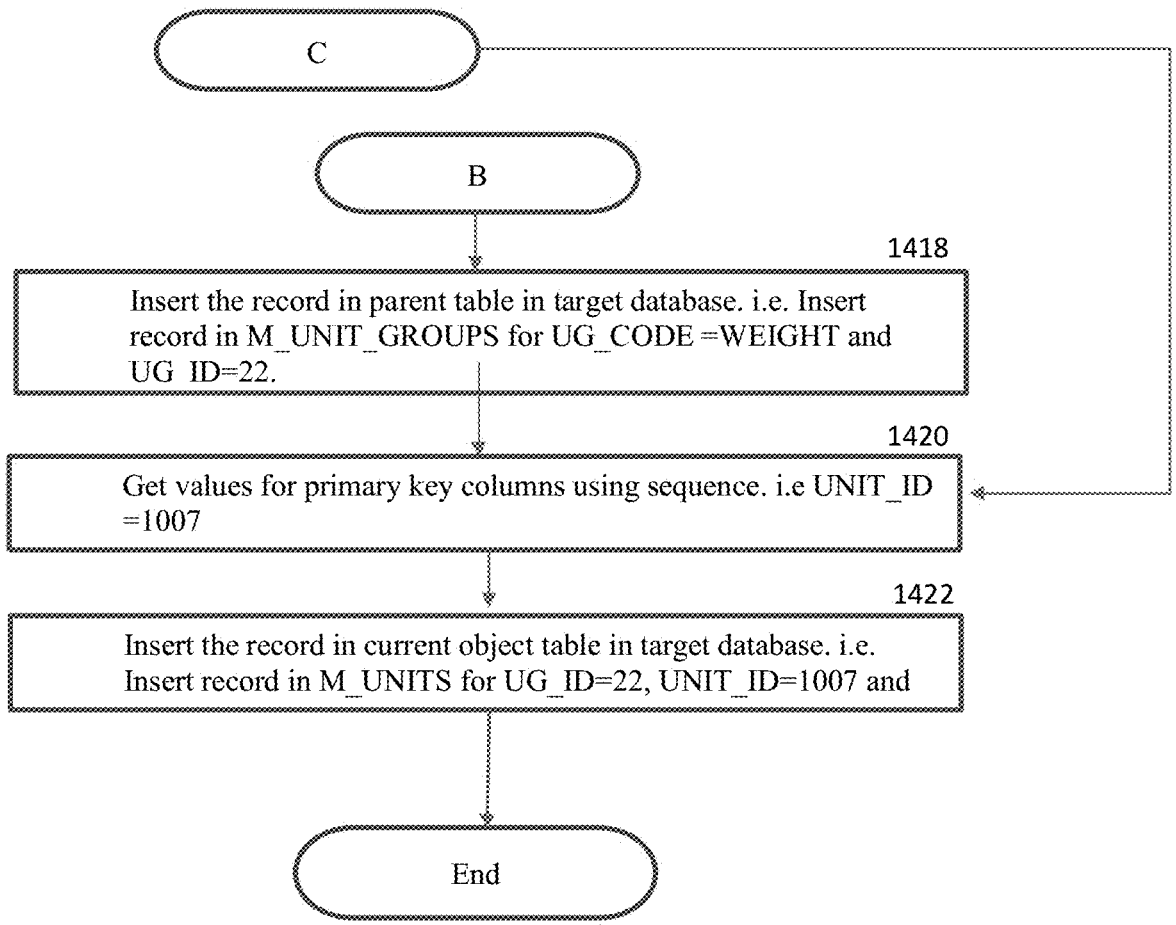

FIGS. 14-16 collectively form a flow chart for the above-described merge process, in accordance with an exemplary embodiment. In block 1402, the SDB Merge Tool obtains the unique key properties of the Unit object based on the configuration file, which, in this example, is the unit with UNIT_CODE=kg. In block 1404, the SDB Merge Tool obtains the primary key of the unit object based on the configuration file, which, in this example, is the UNIT_ID. In block 1406, the SDB Merge Tool then queries the Source database using the unique key, which, in this example, is UNIT_CODE=kg. Then, in block 1408, the SDB Merge Tool checks if the object has any parent objects based on the configuration file. In this example, Unit objects have the parent Unit Group (i.e., YES in block 1408). Thus, in block 1410, the SDB database obtains the unique key parent object based on the configuration file, which, in this example, is the UG_CODE. Then, in block 1412, the SDB Merge Tool obtains the parent unique key value from the Source database by joining UG_ID as defined in the configuration file. Then, in block 1414, the SDB Merge Tool queries the target database using the obtained parent unique key value, which, in this example, is UG_CODE=WEIGHT. Then, in block 1416, the SDB Merge Tool determines if the UG_CODE=WEIGHT record is available in the Target database. In this example, the UG_CODE=WEIGHT record is not available in the Target database (i.e., NO in block 1416), so the SDB Merge Tool returns to block 1408 to check if the UG_CODE=WEIGHT object in turn has any parent objects. In this example, the UG_CODE=WEIGHT object does not have any parent objects (NO in block 1408), so the SDB Merge Tool proceeds to block 1418 in which the SDB Merge Tool inserts the UG_CODE=WEIGHT block into the M_UNIT_GROUPS table with UG_ID=22, as shown in FIG. 12. Then, the SDB Merge Tool determines a value for the primary key (i.e., UNIT_ID=1007), in block 1420, and adds the record to the M_UNITS table, in block 1422, resulting in the database states shown in FIG. 13.

Example—Merge Object into Target Using Existing Parent

As a variation of the above example, the Target database could have included a unit group with UG_CODE=WEIGHT, for example, as shown in FIG. 17. In this case, the SDB Merge Tool can recognize that the Unit with UNIT_CODE=kg exists in the Source database but not in the Target database. The SDB Merge Tool also can recognize that the Unit with UNIT_CODE=kg has a parent in Unit Group with UG_CODE=WEIGHT and also can recognize that the Unit Group with UG_CODE=WEIGHT exists in the Target database, albeit with a different UG_ID. Therefore, the SDB Merge Tool can add the Unit with UNIT_CODE=kg to the Target database using the existing Unit Group with UG_CODE=WEIGHT, resulting in the database states shown in FIG. 18.

With reference again to FIGS. 14-16, in block 1402, the SDB Merge Tool obtains the unique key properties of the Unit object based on the configuration file, which, in this example, is the unit with UNIT_CODE=kg. In block 1404, the SDB Merge Tool obtains the primary key of the unit object based on the configuration file, which, in this example, is the UNIT_ID. In block 1406, the SDB Merge Tool then queries the Source database using the unique key, which, in this example, is UNIT_CODE=kg. Then, in block 1408, the SDB Merge Tool checks if the object has any parent objects based on the configuration file. In this example, Unit objects have the parent Unit Group (i.e., YES in block 1408). Thus, in block 1410, the SDB database obtains the unique key parent object based on the configuration file, which, in this example, is the UG_CODE. Then, in block 1412, the SDB Merge Tool obtains the parent unique key value from the Source database by joining UG_ID as defined in the configuration file. Then, in block 1414, the SDB Merge Tool queries the target database using the obtained parent unique key value, which, in this example, is UG_CODE=WEIGHT. Then, in block 1416, the SDB Merge Tool determines if the UG_CODE=WEIGHT record is available in the Target database. In this example, the UG_CODE=WEIGHT record is available in the Target database (i.e., YES in block 1416), so the SDB Merge Tool proceeds to block 1420 in which the SDB Merge Tool to determine a value for the primary key (i.e., UNIT_ID=1007)

and add the record to the M_UNITS table, in block 1422, resulting in the database states shown in FIG. 18.

Example—Multiple Levels of Dependencies

FIG. 22 shows example database states in which there are multiple levels of dependencies that need to be addressed for both comparing and merging the databases. Specifically, in this example, the M_UNITS table depends on the M_UNIT_GROUPS table, and the M_UNIT_GROUPS table depends on the X table that categorizes unit groups AREA and WEIGHT as spatial properties and categorizes unit group WEIGHT as a physical property (simply for the sake of example). The SDB Merge Tool recognizes that the Target database lacks the unit with UNIT_CODE=kg, recognizes that the Target database also lacks the associated unit group with UG_CODE=WEIGHT, and recognizes that the Target database also lacks the associated category with X_CODE=PHYSICAL. Thus, the SDB Merge Tool first adds a category with X_CODE=PHYSICAL and X_ID=67 to the Target database, resulting in the database states shown in FIG. 23. Then, the SDB Merge Tool adds a unit group with UG_CODE=WEIGHT and UG_ID=69 to the Target database, resulting in the database states shown in FIG. 24. Then, the SDB Merge Tool adds a unit with UNIT_CODE=kg and UNIT_ID=1007 to the Target database, as shown in FIG. 25. In this way, the unit has been added with all of its dependencies.

It should be noted that this process, and the processes described with reference to FIGS. 14-16, can be represented generally as a recursive process using the following pseudo-code, called initially with the primary key for an object obtained from the configuration file (e.g., with regard to the above-described example, the primary key associated with the Unit object with UNIT_CODE=kg):

```
Merge (Key)
{
  Check if Key has one or more parents;
  If Key has one or more parents, then, for each parent:
  {
    Get Parent Key from configuration file;
    Call Merge (Parent Key)
  }
  When parent iteration(s) are complete:
  {
    Get value associated with Key;
    Check if value associated with Key is in Target database;
    If value associated with Key is not in Target database:
      Add record for Key and key value into Target database;
  }
}
```

Thus, in this example, the Merge function initially would be called with the key for UNIT_CODE=kg. This first iteration of the Merge function would determine that the key has a parent (i.e., UG_CODE=WEIGHT) and therefore would invoke the Merge function with the key for UG_CODE=WEIGHT. This second iteration of the Merge function would determine that the key has a parent (i.e., X_CODE=PHYSICAL) and therefore would invoke the Merge function with the key for X_CODE=PHYSICAL. This third iteration of the Merge function would determine that the key does not have a parent. It would then check to see if X_CODE=PHYSICAL exists in the Target database, and, if not, would add a record for X_CODE=PHYSICAL to the Target database. In any case, the third iteration would end and return to the second iteration, which would check to see if UG_CODE=WEIGHT exists in the Target database, and, if not, would add a record for UG_CODE=WEIGHT to the Target database. In any case, the second iteration would end and return to the first iteration, which would check to see if UNIT_CODE=kg exists in the Target database, and, if not, would add a record for UNIT_CODE=kg to the Target database. Upon termination of the first iteration, the object has been merged from the Source database to the Target database.

Similar processing, and similar recursions, can be applied to situations in which a particular object has multiple dependencies at the same level. For example, FIG. 26 shows example database states in which there are multiple dependencies in the M_UNITS table that need to be addressed for both comparing and merging the databases. Specifically, in this example, the M_UNITS table depends on the M_UNIT_GROUPS table, which associates each unit with a unit group, and depends on the X table, which categorizes each unit as either a spatial property or a physical property (simply for the sake of example). The SDB Merge Tool recognizes that the Target database lacks the unit with UNIT_CODE=kg, recognizes that the Target database also lacks the associated unit group with UG_CODE=WEIGHT, and recognizes that the Target database also lacks the associated category with X_CODE=PHYSICAL. Thus, the SDB Merge Tool first adds a category with X_CODE=PHYSICAL and X_ID=67 to the Target database and also adds a unit group with UG_CODE=WEIGHT and UG_ID=69 to the Target database, resulting in the database states shown in FIG. 27. Then, the SDB Merge Tool adds a unit with UNIT_CODE=kg and UNIT_ID=1007 to the Target database, as shown in FIG. 28. In this way, the unit has been added with all of its dependencies.

In this example, the Merge function initially would be called with the key for UNIT_CODE=kg. This first iteration of the Merge function would determine that the key has two parents (i.e., UG_CODE=WEIGHT and X_CODE=PHYSICAL) and therefore would invoke the Merge function with the key for UG_CODE=WEIGHT and would invoke the Merge function with the key for X_CODE=PHYSICAL. These iterations of the Merge function would add records for X_CODE=PHYSICAL and UG_CODE=WEIGHT to the Target database, and would return to the first iteration, which would check to see if UNIT_CODE=kg exists in the Target database, and, if not, would add a record for UNIT_CODE=kg to the Target database. Upon termination of the first iteration, the object has been merged from the Source database to the Target database.

Example SDB Merge Tool User Interface

In an exemplary embodiment, the SDB Merge Tool is a web based tool that provides functionality to view/compare two Intergraph Smart Reference Data (SDB) databases and provide the differences in a user intuitive data grid interface. The user can go through the differences, select the data that needs to be merged, and save the data into the target database. The tool provides the flexibility to selectively merge and save required content from one database to the other.

Typically, SDB users require the set of updates that is available in the released version of SDB. The SDB Merge Tool provides functionality to compare and view differences between the SDB released version and the customer's database and also provides flexibility to merge and save a selective set of content from the SDB released version to the customer database without disturbing any other content in the customer database.

Some of the capabilities of the SDB Merge Tool include:
Intuitive web based user interface to select, view, and merge required data from one SDB database to another.
SDB Merge Tool automatically identifies the mandatory parent (upstream) dependencies required for merging the selected data.
The user can select a set of records and merge all of the selected records with all of the required dependent data into the target database in one step.
The tool provides the ability to report the data from both databases into a spreadsheet file (e.g., a Microsoft EXCEL™ spreadsheet, referred to hereinafter in shorthand as "Excel"). The user can click on a node and report the data related to that object. The data is reported for each attribute value side by side. This enables the user to easily compare the data differences. This functionality helps in identifying exact SDB upgrade changes during the migration process so that the user can select and merge required changes to the target.

Thus, by using the SDB Merge tool, a web based tool, the user can see all the data differences between the source (e.g., SDB 2018) and the target (e.g., customer) databases in an intuitive manner. This allows the user to select only the required data for merging into the target database. Since this is a web based tool, the user can do the merge of data from any machine in the same network which has a compatible browser.

In an exemplary embodiment, the SDB Merge Tool is mainly segregated into three views along with key functionalities on header and footer views, as follows:
Object Hierarchy view
Data Comparison view
Details view In an exemplary embodiment, merging of data using the SDB Merge Tool is only possible from the source database to the target database. All target-only records will be left unchanged and will not be impacted with the merge process.

The Object Hierarchy View consists of a hierarchy of modules through which the user can navigate to the tree nodes and select and merge required data to the target database. Some of the functionality provided in the Object Hierarchy View includes:
Expand/Collapse buttons are available on the object hierarchy. The user can use either keyboard arrows keys (or) mouse clicks to navigate to the different nodes.
Only one node can be selected at a time, and the selected node will be highlighted in a blue color.
All Names are displayed in bold font, which indicates the Parent/Hierarchy node.
All child/leaf nodes will be displayed in normal font.
When the mouse is hovered over the tree hierarchy, the nodes will be highlighted in light blue color.
When the user clicks on a Hierarchy Node that has further child nodes and with no related data, a message "Open child nodes to view data" will be displayed to the user.
The user can hide/unhide the Object Hierarchy view by clicking on an "auto hide" pin button in the tool. Once the hierarchy is hidden, the tool will display as "HIER-ARCHY" with auto hide button in left side top corner.
All Identical records in both source and target databases are displayed in hierarchy without any background color.
All Source-only and Target-only records displayed in the Object Hierarchy View will be highlighted in green text.
If a record exists only in the source database, then it will have an (S) tag appended at the end of that record.
If a record exists only in target database, then it will have a (T) tag appended at the end of that record.
All Difference records displayed in the Object Hierarchy View will be displayed in an orange color text.

The Data Comparison View shows data between the source and target databases side by side. Some of the functionality provided in the Data Comparison View includes Source and Target Data Grids, data filter controls, and merge controls.

The following is a summary of Source and Target Data Grids:
Connected Databases details will be shown above source and target grids in a middle view along with the selected parent and data node details in a hierarchy view.
When the user selects a data node in the object hierarchy view, data available for that node in both the Source and Target will be displayed in the data comparison view with below color format:
All Identical record rows highlighted will not have any color.
All Source Only or Target Only record rows will be highlighted in green background color.
All Difference record rows will be displayed in orange background color.
The same data records in both databases are shown in the same row of the data grid.
When the user scrolls either horizontally or vertically, changes will be reflected in both grids synchronously such that comparable data in columns will be seen side by side in both grids.
Selection of a row in source/target grid rows using a mouse click or keyboard up/down arrows is highlighted in blue color.
When the mouse is hovered over the source/target grid, the rows will be highlighted in light blue color.
The following is a summary of data filter controls:
The user can select/de-select data filters (discussed below), which can be seen on the top of source and Target data grids to filter data being displayed.
When the Identical check box is selected, records that exist in both the source and target databases and have no differences in values will be displayed in the grid.
When the Different check box is selected, records that exist in both the source and target databases and have differences in values will be displayed in the grid.
When the Source Only check box is selected, records that exist in the source database but not the target database will be displayed in the grid.
When the Target Only check box is selected, records that exist in the target database but not the source database will be displayed in the grid.
Selecting/de-selecting combinations of these data filters will display the appropriate data as per selected data filters.
The following is a summary of merge controls:
MERGE—The user can merge one or many records by selecting from the source grid to the target grid. This button will be enabled only when applicable (at least one Source Only or Different record is selected). Using the merge button will only show the intended merge operation in the data grid. It would not save the changes into the target database.

UNMERGE—Once the user merges data from the source database to the target database and clicks on unmerge, the merged data will be unmerged (one step backward). Using the unmerge button will only show the intended unmerge operation in the data grid. It would not save the changes into the target database.

UNDO—Applicable for any number of backward actions. Like "CTRL+Z" functionality on source to target merge activity. Using the Undo button will only show the intended Undo operation in the data grid. It would not save the changes into the target database.

For all Identical and target only records, MERGE/UNMERGE/UNDO will not be enabled. It will be enabled for source only and difference records only.

REFRESH—Gets the latest data at that point of time available for both source and target databases and reloads the respective data grids.

EXCEL REPORT—Generates an Excel report of the data object shown in the data grid.

DELETE AND REPLACE—This is available only for few data objects where selective merge of data is not supported. It would replace all the data in the target database with the source database data for that object.

The Details View shows differences in the values for attributes between the source and target databases for a selected row side by side. Some functionality provided in the Details View includes:

All Identical records will be shown without any colored background.

All Different records will be shown in orange colored background.

All Source and Target Only records will be shown in green colored background.

LMOD (Last Modified Date), User (Modified User) and Int_Rev (Revision Number) attributes are not used for comparison, but the differences between these values will be shown in orange colored background.

The user can hide/unhide this details view by clicking on the "auto hide" pin button in the tool. Once it is hidden, the tool will display as "DETAILS" with auto hide button in right side top corner.

The Footer displays the following for an object selected in the Object hierarchy view:

Count of total records in both source and target database.

Count of showing/displaying records if any data filters are applied.

Count of selected and merged records.

The footer also contains the following controls:

SHOW DEPENDENCIES

SAVE TO DATABASE

The SHOW DEPENDENCIES control allows the user to view a list of dependencies to merge data from the source database to the target database for a selected data node. If there are any dependencies for the selected data to be saved to the target database, then all such dependencies will be listed by pressing this button, e.g., Commodity Code will have dependency on Table Details, Group and Part. There will be no dependencies for leaf nodes; for such cases only selected record will be shown without any dependencies. When the user clicks on the SHOW DEPENDENCIES button, a pop up will be displayed having a tree structure hierarchy of dependent objects applicable for the selected data. The footer shows a count of the number of records to be merged and selected for showing dependencies. A close button is used for closing the dependency window and proceeding for merge.

The SAVE TO DATABASE control saves the merged data into the target database.

The Header includes the following options:

Help: This option allows the user to access a "Detailed User Guide" on how to use the SDB Merge Tool.

About: Version details of "SDB Merge Tool".

Logout: Option to log out of the SDB Merge Tool, once the user complete merging of data from source to target database.

When the user clicks on the Excel Report button, data for the currently displayed data node in both the grids will be exported into an Excel file and saved in an exports folder. Data in Excel is arranged in such a way that both source and target data along with attribute name is placed side by side for better understanding. The user can filter a specific set of records at any point of time in Excel to see exact things to merge. The following is a summary of the functionality of the Excel Report function:

When the user clicks on EXCEL REPORT, a message will be displayed asking for confirmation to proceed with the Export. When the user clicks "Yes", a progress bar will be displayed.

On completion of the export, the completion dialog will be displayed with button to download the file. When user clicks "Download", the generated Excel file will be downloaded in a browser specific downloads folder path.

Even if the user does not download the Excel file, the generated Excel file will exist in the "Exports" folder available inside a hosted merge tool physical path.

Irrespective of the selected data filters, all the data in both the source and target databases will be written into the Excel file.

In the CMS Module for Component Management, a new pop up will be displayed for selecting class hierarchy. Data related to selected class hierarchy only will be exported into the Excel workbook.

For all the data nodes that have the Save Direct Children checkbox checked while saving the data to target database, the Excel Report will export their child node data along with parent data in the Excel report workbook, e.g., when commodity rules are exported: Commodity Rule along with Commodity Rule details, Keys and Layouts will also be exported at one go.

The Merge tool export process is a highly resource intensive job; based on the number of records in the selected databases and system resources available, it is not recommended to run multiple Excel export jobs simultaneously.

The following is an exemplary procedure of how the Excel report can be used in the Merge workflow.

1. When the user wants to perform a merge operation on a data node which contains a huge amount of data, the user needs to first generate an Excel report of that data node using "Excel Report" option.

2. On the generated Excel report, apply filter for source only and different only records.

3. Review the data that the user wants to merge to their (customer) database.

4. Select and perform merge on those records.

5. Save the selected records to the target database by clicking the "SAVE TO DATABASE" button.

6. After merging the identified data, regenerate the Excel report again and verify necessary changes are saved into the target database.

Delete and Replace functionality will be enabled for a few screens in the SDB Merge Tool, e.g., if user wants to merge spec item/commodity code details to merge data from the source database to the target database, data in the target database needs to be deleted first and then replace with the entire source data to avoid duplicates and inconsistencies in data. For all such scenarios, this option will be enabled. Delete and Replace is applicable for following data nodes:

a. Commodity Code Details
b. Specification Items
c. Specification Header Geometries
d. Specification Header Details Clicking the Save to Database button will show the dependent parent hierarchy and saves the selected records to the target database. This button will be enabled once the user merges the data in the data grid from the source to the target. Functionality includes:

- When the user clicks on the Save to database button, a pop up will be displayed having a tree structure hierarchy of dependent objects for merge and respective object specific unique values displayed along with check box to select at left corner of each row.
- A count on the footer specifies the number of records to be merged and selected for save are shown as selected.
- Note displayed below specifies all mandatory dependencies to check after the merge is performed and a recommendation for a complete data view of what other things need to be merged is displayed wherever applicable.
- Cancel button on right bottom used for closing save window.
- Save button on right bottom corner helps in saving selected merge records in the target database.
- The Merge Tool honors the control status values defined on the target database. It will not edit/modify the records in the target database if the control status is other than 1.
- Show Dependency and Save to Database buttons will be enabled when the user merges data in the data grid.

When the user clicks to save records to the target database with check box selection (Save direct children for source only data), the merge tool will save the commodity code along with all child records of respective commodity codes automatically, i.e., Commodity code details, Idents, Tag Numbers, Commodity Layouts, Commodity Geometries at one go. This functionality will be applicable only for Source-only records. For other cases, the user needs to check and merge data required by navigating to the respective screens.

A sort function is provided on all columns available in the source and target grid of the data comparison view. If the user applies a sort function on any column in the source or target grid, it will be applied on both grids to make sure grid rows will be in sync and comparable with each other. The default sort order is based on Identical, Source Only, Different, Target Only order. When the user clicks on a column header, the data will be sorted in ascending order (Sorted column will be displayed with upward arrow adjacent to header column name). When the user re-clicks on the same column header, the data will be sorted in descending order (Sorted column will be displayed with downward arrow adjacent to header column name). The user can CTRL+ click on multiple columns for sorting the data in order of selection of columns. (Sort order will be displayed with number adjacent to column header name). The user can sort one column ascending and multiple columns in descending order as well. Number columns will be sorted per numerical ascending or descending order. Remaining all string columns will be sorted based on alphabetical ascending or descending order. When the user switches from source grid to target grid to sort columns, all previous sorts applied on both grids will be disabled, as this functionality is applicable for both grids.

A filter function is provided to allow the user to filter required column values based on a given filter condition. When the user clicks on the filter button adjacent to a column header name, a pop-up with column name heading will be displayed. The values to be searched need to be entered in the text field, and the filter will be applied by clicking on "FILTER" button. The applied filter will be applied on both source and target grids, and data is displayed as per the applied filter. Filters can be applied on two columns using an "AND" condition, e.g., specifying both conditions that need to be considered and then applying filter. To consider any of a number of defined filter conditions, an "OR" condition can be used.

Search conditions need to be selected based on user requirements. For example, the following is a summary of filtering using String Columns Filters:

- "Contains" search condition can be used, if the user knows the substring of data to be filtered.
- When the user wants to filter column values without specific substring in column value, "Does not Contain" needs to be selected.
- When the user wants to filter a specified column value exactly, "Is equal to" needs to be selected.
- When the user does not want to filter a specified column value exactly, "Is not equal to" needs to be selected.
- When a filter is applied on column values starting with a specific input, "Starts with" needs to be selected.
- When a filter is applied on column values that do not start with specific input, "Does not start with" needs to be selected.
- When a filter is applied on column values ending with a specific input, "Ends with" needs to be selected.
- When a filter is applied on column values that do not end with specific input, "Does not end with" needs to be selected.
- When a filter is applied on column values having empty values, "Is empty" needs to be selected.
- When a filter is applied on column values having not empty values, "Is not empty" needs to be selected.

The following is a summary of filtering using Numeric Column Filters:

- When a filter is applied on column values having blank values, "Is blank" needs to be selected.
- When a filter is applied on column values having not blank values, "Is not blank" needs to be selected.
- When the user wants to filter specified numeric column value exactly, "Is equal to" needs to be selected.
- When the user does not want specified numeric column value exactly, "Is not equal to" needs to be selected.
- When a filter is applied on column values having greater than values, "Is greater than" needs to be selected.
- When a filter is applied on column values having greater than or equal values, "Is greater than or equal" needs to be selected.
- When a filter is applied on column values having less than values, "Is less than" needs to be selected.
- When a filter is applied on column values having less than or equal values, "Is less than or equal" needs to be selected.

Merge Workflows

This module implements the following merge steps:

1) The user selects Source Only and/or Different records as required.
2) The tool merges the selected records to the Target grid of the merge UI.
3) The tool shows Dependency for selected-merge records.
4) The tool saves the selected-merge records to the Target Database.

Administration

This module covers merge of below Administration related objects and respective child nodes:

Languages
Standards
Disciplines
Units related objects (Unit Systems, Unit Sets, Unit Groups, Unit Types and Unit To Unit)
Interfaces
Interface Dependent Units
Parameters
Interface settings
Project/Project Discipline Defaults The user should traverse all data nodes under each object to select required rows and merge them to the target. The user needs to validate and select the required data only for the merging process.

The Document Management module covers merge of the following Document Management related objects and respective child nodes:

Documents
Tool Version Management
Symbol Library Management

When the user merges documents that are source only, then document files (symbol DLL) will be merged automatically as an additional dependency. To merge the child data for source only records, make sure in save window, the checkbox for 'save child dependencies for source only' is checked. When the user merges data at the commodity code level without merging the applicable documents first, then documents and only dependent parent data like PDB documents, Symbol Library and Symbols will be merged but the other additional dependencies like document files, PDB Document views will not be merged automatically. The user needs to merge these objects manually to get symbol DLLs and gif files at the time export of commodity codes using SRD transfer jobs screen.

The Attribute Management module allows the user to merge Attribute Groups and respective child nodes as part of this object. The user has to verify and merge the required attribute groups, attributes and attribute values separately at each level where ever applicable. Merging of additional child dependencies is not applicable for these data nodes.

The Table Management module covers merge of the following Table Management related objects and respective child nodes:

Table Types (For Details). This node is used to merge the Tables and respective Table details. There are three types of table types under this module (Commodity Code Tables, Interface Tables and Specification Tables).
Table Types (All)—Table Attributes. This node is used to merge the Tables and respective Table attributes which are used for creating geometrics. Since there is huge data present under Table Management module, it is recommended to use Excel Report functionality to identify the required data that needs to be merged.

The Geometric Management module covers merge of the following Geometric Management related objects and respective child nodes:

All types of Geometric Tables. This node is used to merge all the geometric related data (Commodity Geometrics, Filter Geometrics, Other Geometrics, Other Special Geometrics, Rating Geometrics, Standard Geometrics and Wall thickness Geometrics).
Nominal Sizes. This node is used to merge the Nominal size tables used in the specifications.
Outer Diameters. This node is used to merge the Outer Diameter tables.
Branches. This node is used to merge the Branch tables used in the specifications.
Schedules. This node is used to merge the Outer Diameter tables.
Nominal Reducers. This node is used to merge the Nominal Reducer tables.
Metric/English Equivalence. This node is used to merge English to Metric Equivalence tables.

Merging of "Source Only" Geometric tables will merge the respective table details/attributes automatically if 'Save direct children for source only data' checkbox is selected. For target-only records, the user needs to verify if this data will create any duplicates in the target database and take appropriate action.

The Commodity/Ident Management module covers merge of the following Commodity/Ident Management related objects and respective child nodes:

Commodity Rules. This node is used to merge the commodity rules and their child details.
Commodity Group/Part/Commodity Codes. This node is used to merge Commodity Groups, Parts, Commodity Codes and respective child details in sequential order. For Commodity Code Details, Delete and Replace Functionality is implemented since the commodity code is completely dependent on commodity code details. And partial merging of commodity code details will lead to incorrect data in customer database. Delete and Replace functionality is implemented such that even If user selects a single record for merging, all the data under that node will be merged to customer database automatically.
Object Parameters. This node is used to merge the Object parameters and their child details.
Part Object Parameters. This node is used to merge Object parameters linked with the parts.
Parts with Table Groups and Parts with Table Details. These nodes are used to merge Table groups and tables details linked with the parts.
Parts with SP3D Short Codes. This node is used to merge S3D short codes assigned at the part level.

The Geometric Rules module is used to merge Geometric rules and respective child details. Merging of "Source Only" Geometric rules will merge the respective rule definitions automatically if 'Save direct children for source only data' checkbox is selected. For target-only/Different records, the user needs to validate the data and take appropriate action.

The Specification module covers merge of the following Specification related objects and respective child nodes:

Short code management. This node is used to merge the SRD short codes and respective child details.
Notes. This node is used to merge the Specification notes.
Specification Rules. This node is used to merge the specification rules and respective child details.
Specification Types. This node is used to merge the specification types and respective child details.

Functional Specification Setup. This node is used to merge the Functional specification setup and respective child details.

Specifications. This node is used to merge the all the specification related data and respective child details. For Specification Header Geometrics, Specification Details, and Specification Items, the Delete and Replace functionality is implemented since partial merging of the data related to these nodes will lead to incorrect data in customer database. Delete and Replace functionality is implemented such that even If user selects a single record for merging, all the data under that node will be merged to customer database automatically.

The Smart 3D/CADWorx Integration module covers merge of the following Smart 3D/CADWorx Integration related objects and respective child nodes:

Configuration. This node is used to merge the all the Smart3D/CADWorx configuration related data (Data Tables, Smart 3D Attributes, Transfer Types, Retrieval Sources, Procedures, Data Table Configurations, Templates, Data table mappings and Attribute mappings) and respective child details.

Transfer Jobs. This node is used to merge the all the Smart3D/CADWorx transfer job related data (General Configurations, Destinations, Catalog Structures and Transfer Jobs) and respective child details.

The SPIso Integration module covers merge of the following SPIso Integration related objects and respective child nodes:

Master Data. This node is used to merge all the SPIso master data required for configuring SPIso integration and respective child details.

SPIso SKEY Mappings. This node is used to merge the SKEY mappings required for configuring SPIso integration and respective child records.

Export. This node is used to merge the SPIso export related data and respective child records.

The CMS (Component Management System) module covers merge of the following CMS related objects and respective child nodes:

Manage Class Systems. This node is used to merge CMS Class related data and respective child details.

Component Manager. This node is used to merge CMS Components related data and respective child details.

All merge operations under CMS module should be performed with Project SDB and Language English only. Unique key details need to be set on source database for existing class properties prior to merge of CMS component data.

Figure 29:
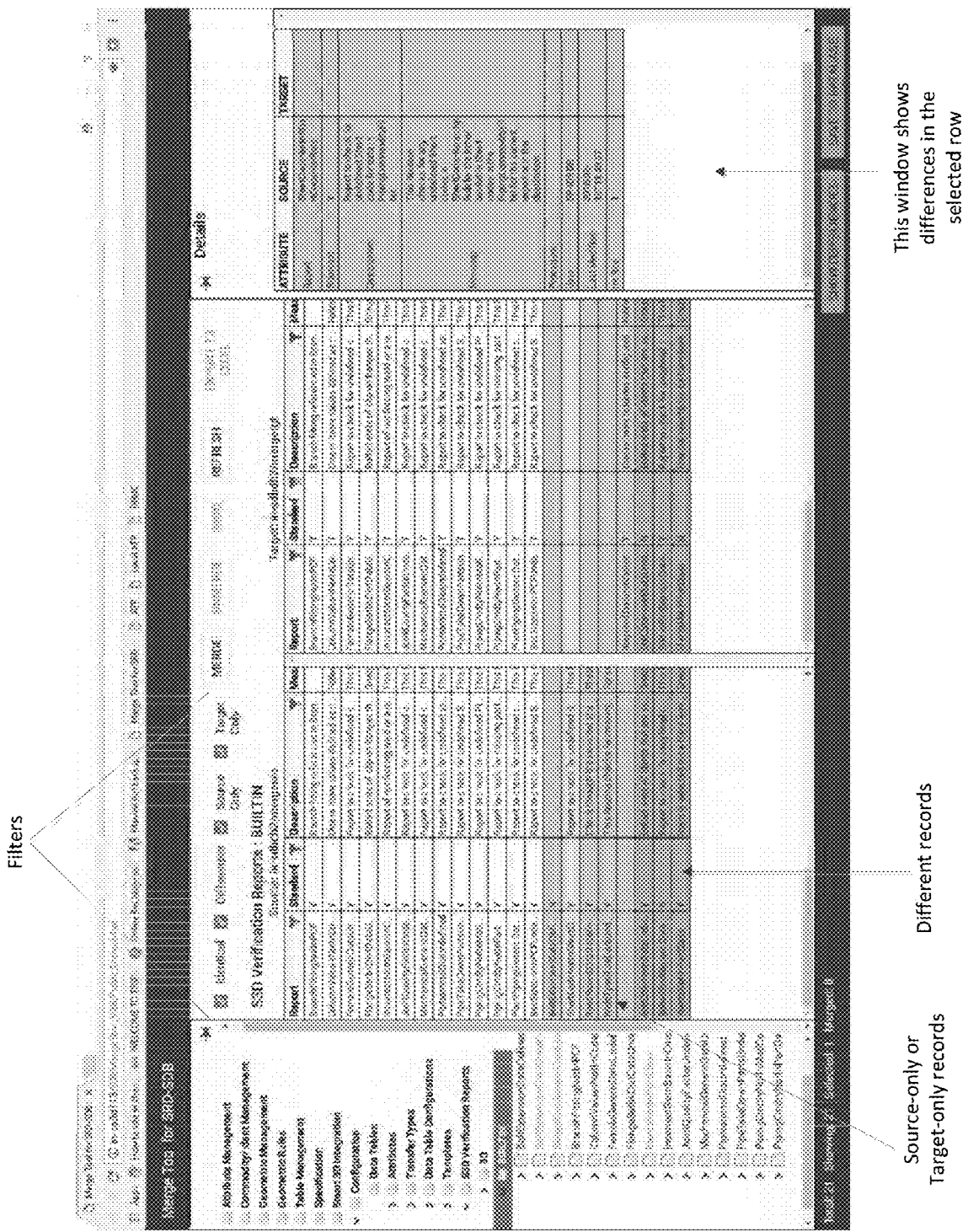
FIG. 29 is an annotated screenshot showing an example Data Comparison window for S3D information in accordance with an exemplary embodiment.

FIG. 29 is an annotated screenshot showing an example Data Comparison window for S3D information in accordance with an exemplary embodiment. The main portion of the window shows, in order from top to bottom, records that are identical (not highlighted), the records that are source-only or target-only (highlighted in green), and the records that are different (highlighted in orange). On the right-hand side of the screen is a window that shows the differences for a selected row (in this example, the second row in the green highlighted section). The filter buttons are identified.

Figure 30:
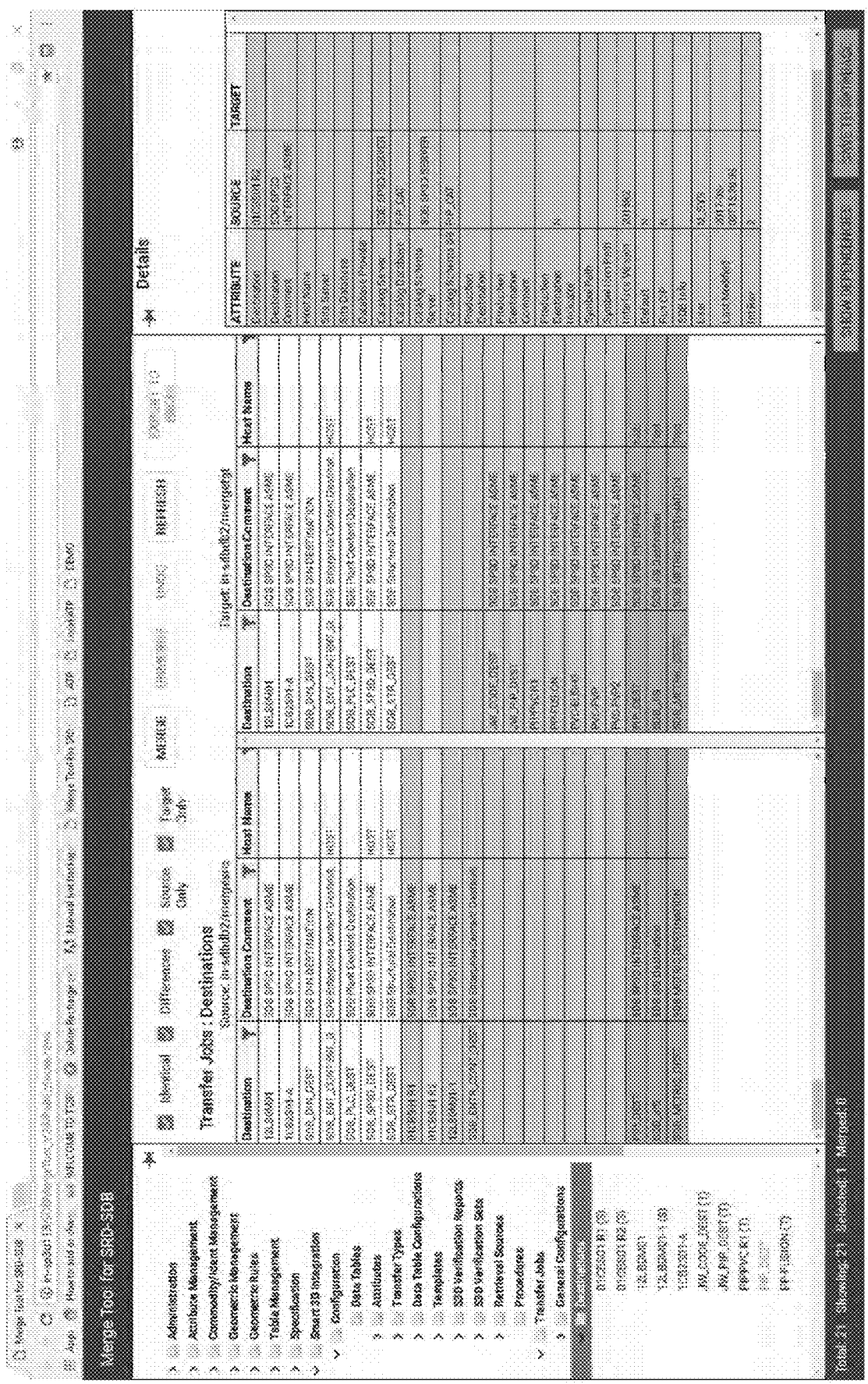
FIG. 30 is a screenshot showing an example Data Comparison window for Transfer Jobs information in accordance with an exemplary embodiment.

FIG. 30 is a screenshot showing an example Data Comparison window for Transfer Jobs information in accordance with an exemplary embodiment. As in FIG. 29, the main portion of the screen shows, in order from top to bottom, records that are identical (not highlighted), the records that are source-only or target-only (highlighted in green), and the records that are different (highlighted in orange). On the right-hand side of the screen is a window that shows the differences for a selected row (in this example, the second row in the green highlighted section).

Figure 31:
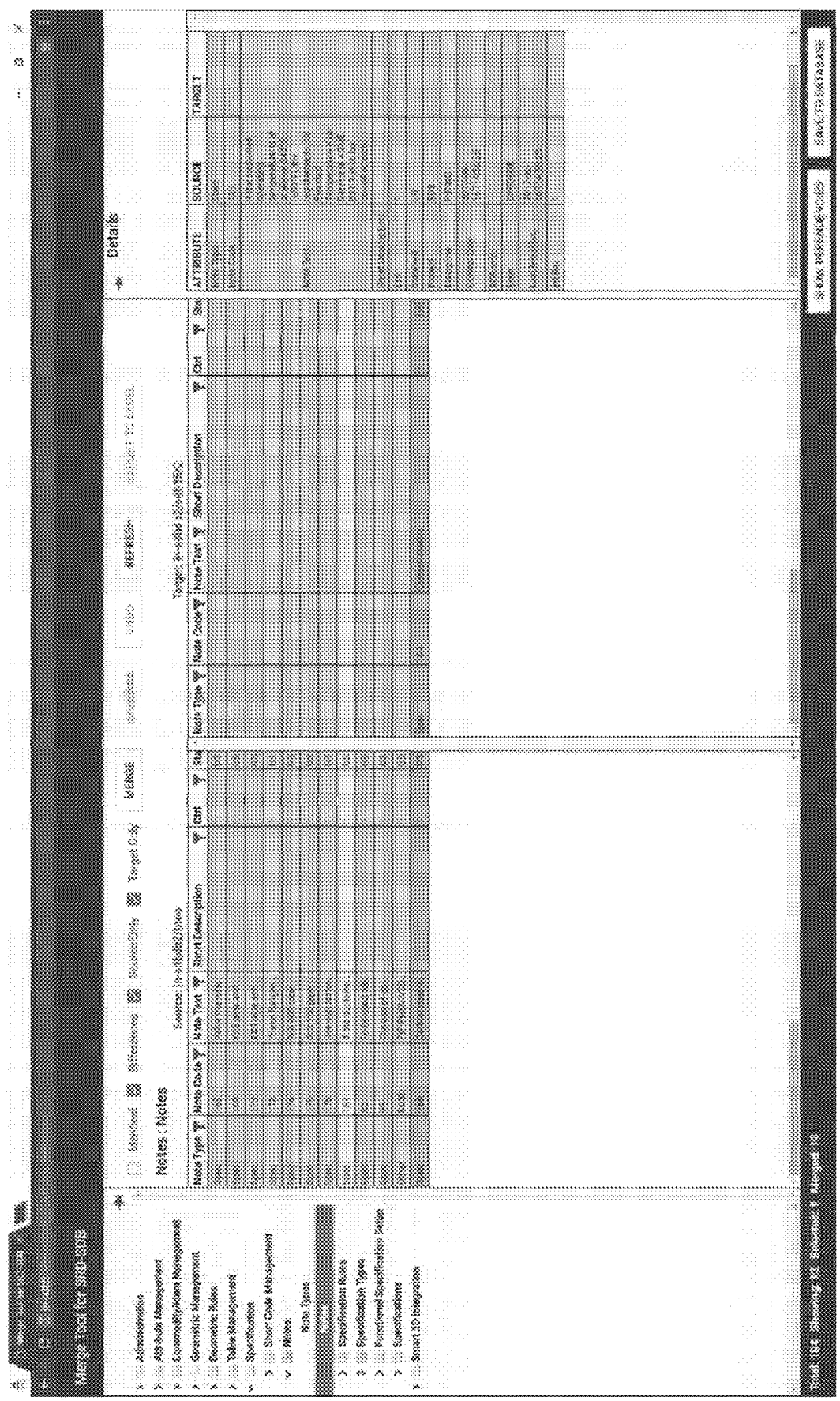
FIG. 31 is a screenshot showing an example Data Comparison window for Notes information in accordance with an exemplary embodiment.

FIG. 31 is a screenshot showing an example Data Comparison window for Notes information in accordance with an exemplary embodiment. Here, the "Identical" filter is turned off, such that only source-only, target-only, and differences records are shown.

Figure 32:
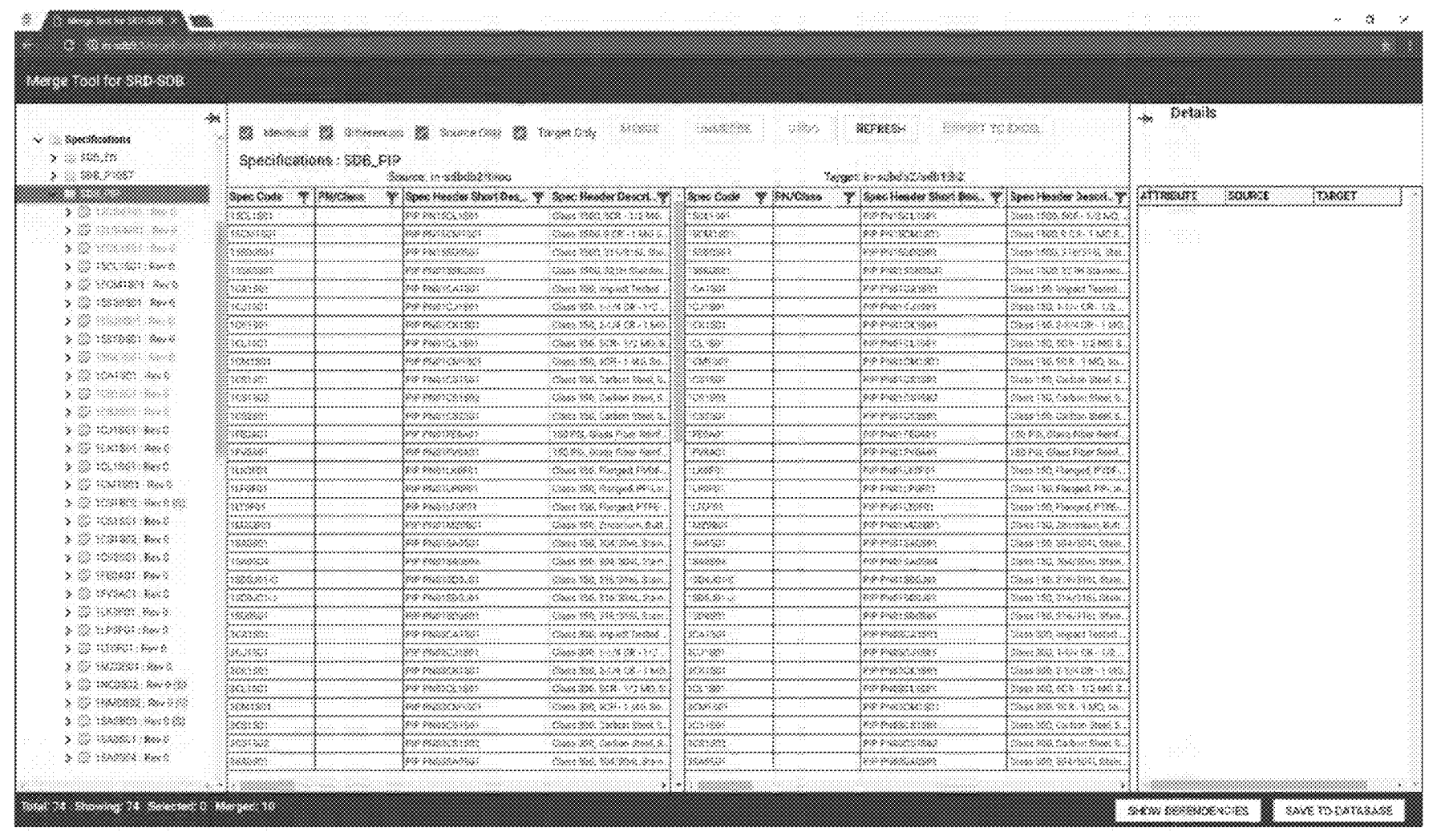

FIG. 32 is a screenshot showing an example Data Comparison window in which all displayed records are identical in both databases in accordance with an exemplary embodiment.

Figure 33:
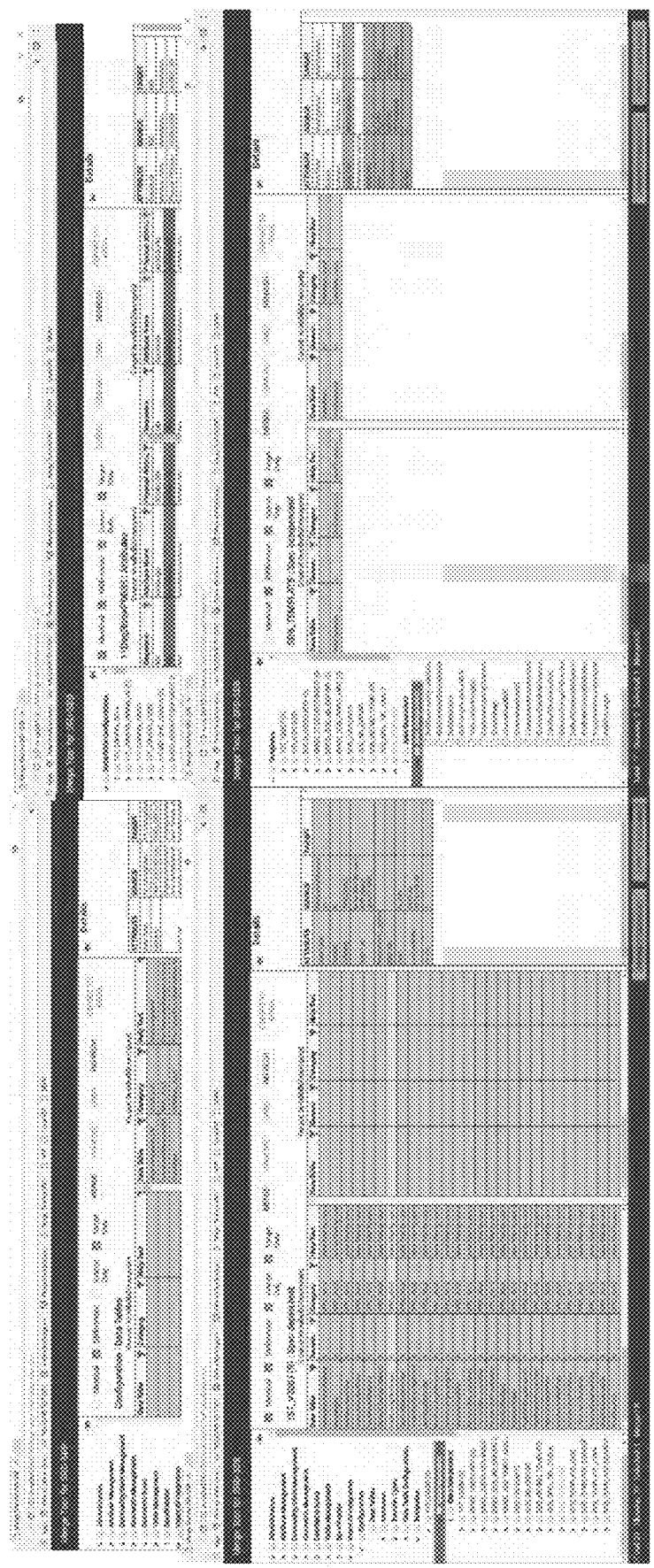
FIG. 33 is a screenshot showing four active SDB Merge Tool windows in accordance with an exemplary embodiment.

FIG. 33 is a screenshot showing four active SDB Merge Tool windows in accordance with an exemplary embodiment.

Figure 34:
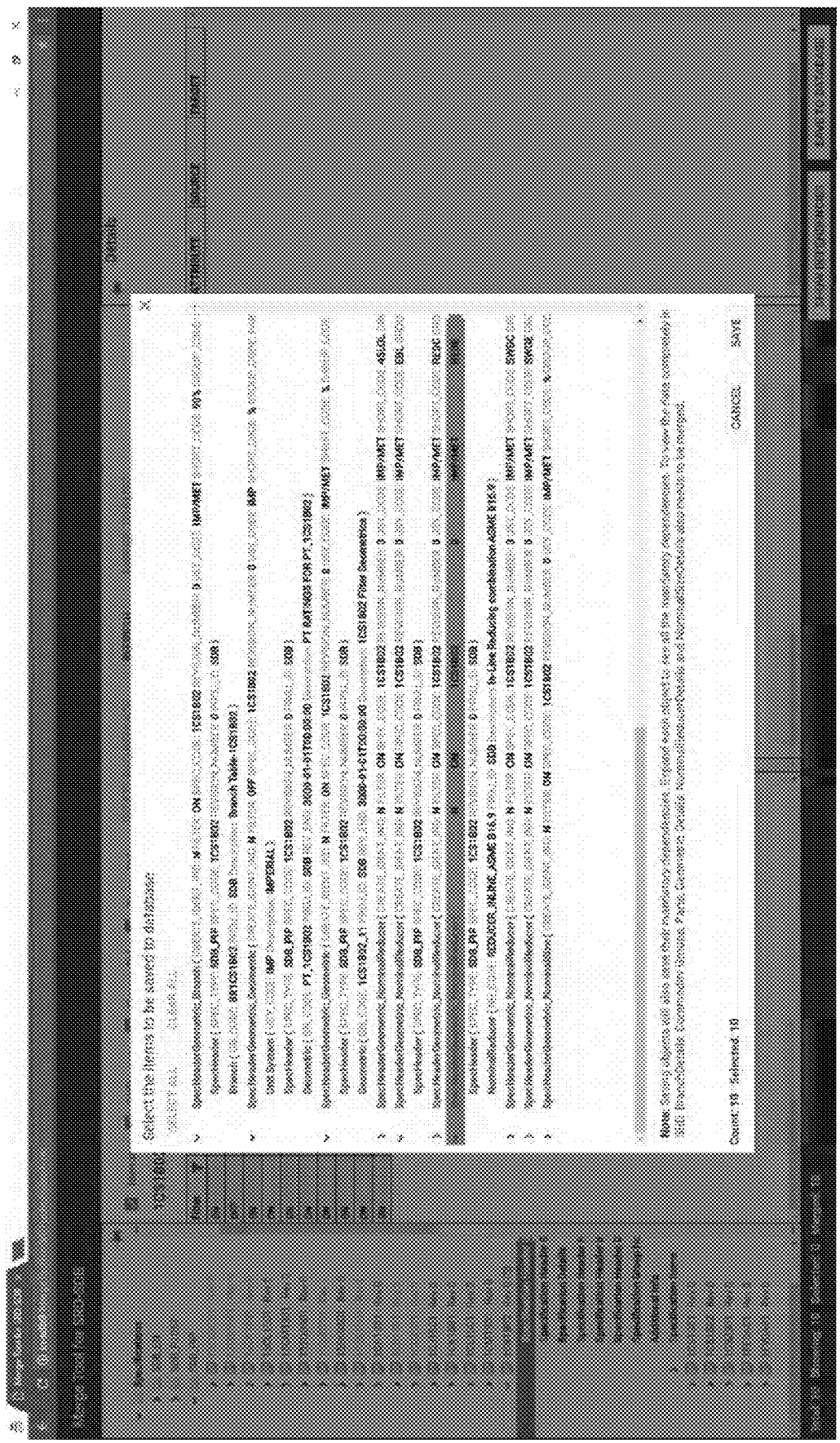
FIG. 34 is a screenshot showing an example Object Dependency Hierarchy window in accordance with an exemplary embodiment.

FIG. 34 is a screenshot showing an example Object Dependency Hierarchy window in accordance with an exemplary embodiment. From this window, the user can select an object and merge it into the target database including all mandatory dependencies. The user can expand an object in order to see all of its mandatory dependencies.

Figure 35:
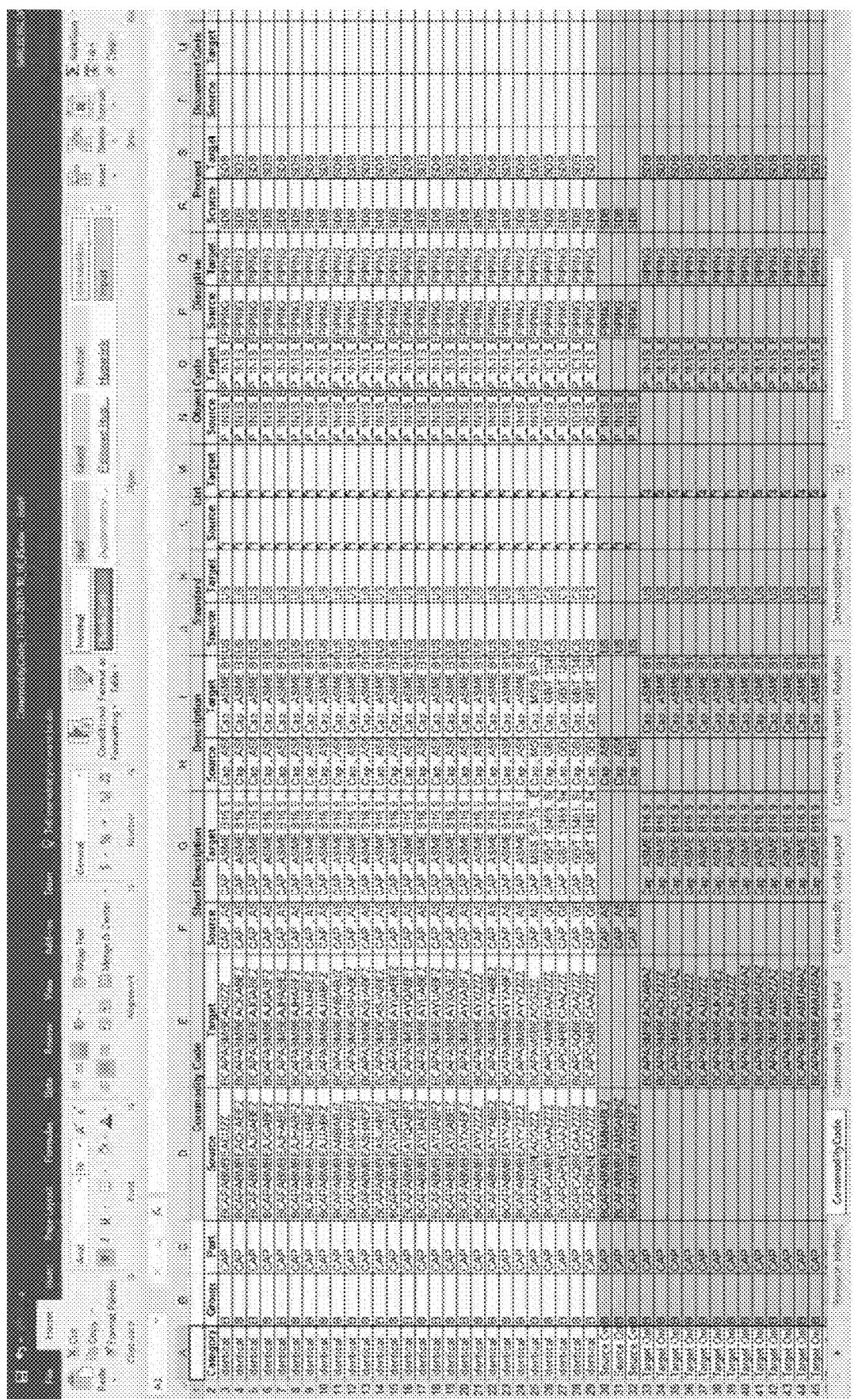
FIG. 35 is a screenshot showing an Export to Excel window in a first format in which records are ordered by Identical, Source-only, Target-only, and Different, in accordance with an exemplary embodiment.

FIG. 35 is a screenshot showing an Export to Excel window in a first format in which records are ordered by Identical, Source-only, Target-only, and Different, in accordance with an exemplary embodiment.

Figure 36:
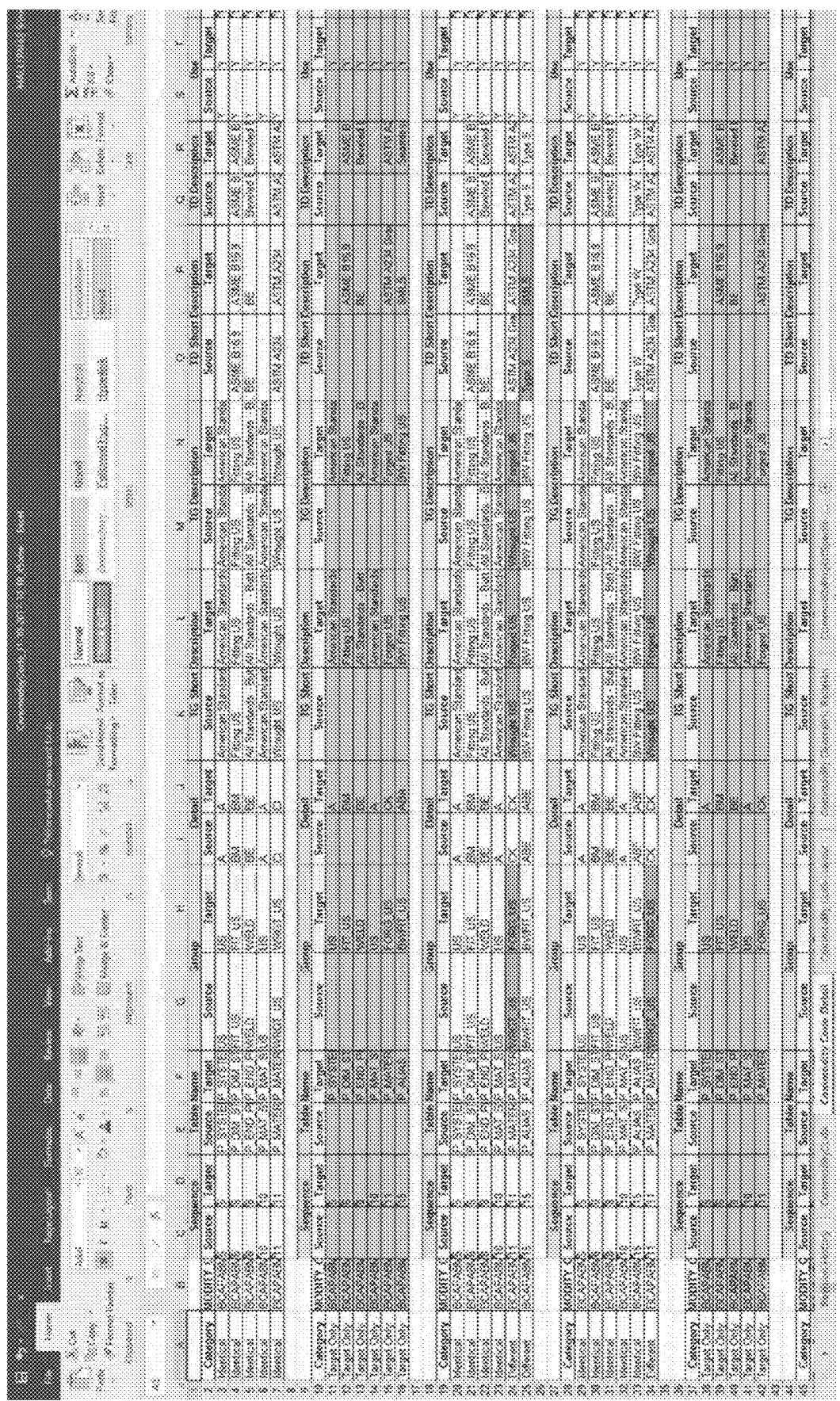
FIG. 36 is a screenshot showing an Export to Excel window in a second format in which individual differences are highlighted, in accordance with an exemplary embodiment.

FIG. 36 is a screenshot showing an Export to Excel window in a second format in which individual differences are highlighted, in accordance with an exemplary embodiment. Here, for example, one particular object is listed in the Source database as being Wrought and is listed in the Target database as being Forged. This difference is highlighted in orange. Source-only and Target-only records are highlighted in green.

Miscellaneous

It should be noted that headings are used above for convenience and are not to be construed as limiting the present invention in any way.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions. Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

It should be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., the SDB Merge Tool described herein) are necessarily non-conventional because, absent special programming or configuration, the conventional components do not inherently perform the described non-conventional methods.

The present invention may be embodied in other specific forms without departing from the true scope of the invention, and numerous variations and modifications will be apparent to those skilled in the art based on the teachings herein. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A method of merging an object from a source database to a target database, the object associated with data stored in a plurality of relational database tables in the source database, the method comprising:
  obtaining a primary key for the object, wherein the object is a child object in the source database;
  querying the source database using the primary key for the child object to obtain a primary key value from a first relational database table, wherein the first relational database table includes a parent key associated with the primary key value as a reference to a parent key value in a parent object stored in a second relational database table; and, after querying the source database using the primary key for the child object to obtain the primary key value, further comprising:
  identifying the parent object associated with the child object based on the parent key from the first relational database table, the parent object associated with the second relational database table;
  obtaining the parent key for the identified parent object from the first relational database table;
  querying the source database using the obtained parent key to obtain the parent key value from the second relational database table;
  querying the target database using the obtained parent key value to determine whether the target database includes an existing parent object record with the parent key value;
  when the target database does not include an existing parent object record with the parent key value, assigning a parent key for the parent key value and adding a parent object record to the target database including the parent key value and the parent key and then adding an object record to the target database including the primary key value and the parent key as a reference to the parent key value in the added parent object record, wherein the parent key for the parent key value in the target database is assigned independently of the parent key for the parent key value in the source database; and
  when the target database does include an existing parent object record with the parent key value, obtaining from the existing parent object record a parent key associated with the parent key value and adding an object record to the target database including the primary key value and the parent key obtained from the existing parent object record as a reference to the parent key value in the existing parent object record.

2. The method of claim 1, wherein querying the source database using the parent key to obtain a parent key value from the second relational database comprises:
  joining the first and second relational database tables.

3. The method of claim 1, wherein adding the parent object record to the target database including the parent key value comprises:
  assigning an identifier for the parent key value, wherein the identifier is unique within the target database and is assigned independently of a corresponding identifier for the parent key value in the source database.

4. The method of claim 3, wherein the reference to the parent key value includes the unique identifier assigned for the parent key value.

5. The method of claim 1, wherein adding the object record to the target database comprises:
  assigning an identifier for the primary key value, wherein the identifier is unique within the target database and is assigned independently of a corresponding identifier for the primary key value in the source database.

6. The method of claim 5, wherein, when the parent key value does exist in a parent object record in the target database, the reference to the parent key value includes an identifier associated with the existing parent key value.

7. The method of claim 1, further comprising:
  maintaining a configuration file that describes the data stored in the plurality of relational database tables including the primary key for the object and relationships between the plurality of relational database tables, wherein the primary key for the object, identification of the parent object, and the parent key are obtained from the configuration file.

8. A database system comprising:
  a plurality of relational database tables; and
  a merge tool having program code that, when executed by at least one processor of the database system, causes the database system to perform computer processes comprising:
  obtaining a primary key for the object, wherein the object is a child object in the source database;
  querying the source database using the primary key for the child object to obtain a primary key value from a first relational database table, wherein the first relational database table includes a parent key associated with the primary key value as a reference to a parent key value in a parent object stored in a second relational database table; and, after querying the source database using the primary key for the child object to obtain the primary key value, further comprising:
  identifying the parent object associated with the child object based on the parent key from the first relational database table, the parent object associated with the second relational database table;
  obtaining the parent key for the identified parent object from the first relational database table;
  querying the source database using the obtained parent key to obtain the parent key value from the second relational database table;
  querying the target database using the obtained parent key value to determine whether the target database includes an existing parent object record with the parent key value;
  when the target database does not include an existing parent object record with the parent key value, assigning a parent key for the parent key value and adding a parent object record to the target database including the parent key value and the parent key and then adding an object record to the target database including the primary key value and the parent key as a reference to the parent key value in the added parent object record, wherein the parent key for the parent key value in the target database is assigned independently of the parent key for the parent key value in the source database; and
  when the target database does include an existing parent object record with the parent key value, obtaining from the existing parent object record a parent key associated with the parent key value and adding an object record to the target database including the primary key value and the parent key obtained from the existing parent object record as a reference to the parent key value in the existing parent object record.

9. The database system of claim 8, wherein querying the source database using the parent key to obtain a parent key value from the second relational database comprises:
  joining the first and second relational database tables.

10. The database system of claim 8, wherein adding the parent object record to the target database including the parent key value comprises:

assigning an identifier for the parent key value, wherein the identifier is unique within the target database and is assigned independently of a corresponding identifier for the parent key value in the source database.

11. The database system of claim 10, wherein the reference to the parent key value includes the unique identifier assigned for the parent key value.

12. The database system of claim 8, wherein adding the object record to the target database comprises:
assigning an identifier for the primary key value, wherein the identifier is unique within the target database and is assigned independently of a corresponding identifier for the primary key value in the source database.

13. The database system of claim 12, wherein, when the parent key value does exist in a parent object record in the target database, the reference to the parent key value includes an identifier associated with the existing parent key value.

14. The database system of claim 8, further comprising:
maintaining a configuration file that describes the data stored in the plurality of relational database tables including the primary key for the object and relationships between the plurality of relational database tables, wherein the primary key for the object, identification of the parent object, and the parent key are obtained from the configuration file.

15. A computer program product comprising a tangible, non-transitory computer readable medium having embodied therein program code that, when executed by at least one processor of the database system, causes the database system to perform computer processes comprising:
obtaining a primary key for the object, wherein the object is a child object in the source database;
querying the source database using the primary key for the child object to obtain a primary key value from a first relational database table, wherein the first relational database table includes a parent key associated with the primary key value as a reference to a parent key value in a parent object stored in a second relational database table; and, after querying the source database using the primary key for the child object to obtain the primary key value, further comprising:
identifying the parent object associated with the child object based on the parent key from the first relational database table, the parent object associated with the second relational database table;
obtaining the parent key for the identified parent object from the first relational database table;
querying the source database using the obtained parent key to obtain the parent key value from the second relational database table;
querying the target database using the obtained parent key value to determine whether the target database includes an existing parent object record with the parent key value;

when the target database does not include an existing parent object record with the parent key value, assigning a parent key for the parent key value and adding a parent object record to the target database including the parent key value and the parent key and then adding an object record to the target database including the primary key value and the parent key as a reference to the parent key value in the added parent object record, wherein the parent key for the parent key value in the target database is assigned independently of the parent key for the parent key value in the source database; and when the target database does include an existing parent object record with the parent key value, obtaining from the existing parent object record a parent key associated with the parent key value and adding an object record to the target database including the primary key value and the parent key obtained from the existing parent object record as a reference to the parent key value in the existing parent object record.

16. The computer program product of claim 15, wherein querying the source database using the parent key to obtain a parent key value from the second relational database comprises:
joining the first and second relational database tables.

17. The computer program product of claim 15, wherein adding the parent object record to the target database including the parent key value comprises:
assigning an identifier for the parent key value, wherein the identifier is unique within the target database and is assigned independently of a corresponding identifier for the parent key value in the source database.

18. The computer program product of claim 17, wherein the reference to the parent key value includes the unique identifier assigned for the parent key value.

19. The computer program product of claim 15, wherein adding the object record to the target database comprises:
assigning an identifier for the primary key value, wherein the identifier is unique within the target database and is assigned independently of a corresponding identifier for the primary key value in the source database.

20. The computer program product of claim 19, wherein, when the parent key value does exist in a parent object record in the target database, the reference to the parent key value includes an identifier associated with the existing parent key value.

21. The computer program product of claim 15, further comprising:
maintaining a configuration file that describes the data stored in the plurality of relational database tables including the primary key for the object and relationships between the plurality of relational database tables, wherein the primary key for the object, identification of the parent object, and the parent key are obtained from the configuration file.

* * * * *

UNITED STATES PATENT AND TRADEMARK OFFICE
CERTIFICATE OF CORRECTION

PATENT NO. : 11,120,025 B2
APPLICATION NO. : 16/104361
DATED : September 14, 2021
INVENTOR(S) : Pradeep Reddy Bobbala et al.

It is certified that error appears in the above-identified patent and that said Letters Patent is hereby corrected as shown below:

In the Claims

At Column 59, Claim number 2, Line number 3, please add --table-- after "second relational database"

At Column 60, Claim number 9, Line number 3, please add --table-- after "second relational database"

At Column 62, Claim number 16, Line number 3, please add --table-- after "second relational database"

Signed and Sealed this
Fourteenth Day of December, 2021

Drew Hirshfeld
*Performing the Functions and Duties of the
Under Secretary of Commerce for Intellectual Property and
Director of the United States Patent and Trademark Office*